US011249357B2

(12) United States Patent
Sugiura

(10) Patent No.: US 11,249,357 B2
(45) Date of Patent: Feb. 15, 2022

(54) LIQUID CRYSTAL DEVICE AND ELECTRONIC APPARATUS

(71) Applicant: SEIKO EPSON CORPORATION, Tokyo (JP)

(72) Inventor: Yukihiro Sugiura, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/105,678

(22) Filed: Nov. 27, 2020

(65) Prior Publication Data

US 2021/0165290 A1 Jun. 3, 2021

(30) Foreign Application Priority Data

Nov. 28, 2019 (JP) .............................. JP2019-215076

(51) Int. Cl.
| G02F 1/1362 | (2006.01) |
| G02F 1/1335 | (2006.01) |
| G02F 1/1343 | (2006.01) |
| G02F 1/1337 | (2006.01) |
| G02F 1/1368 | (2006.01) |

(52) U.S. Cl.
CPC .. G02F 1/136209 (2013.01); G02F 1/133512 (2013.01); G02F 1/133707 (2013.01); G02F 1/134363 (2013.01); *G02F 1/1337* (2013.01); *G02F 1/1368* (2013.01)

(58) Field of Classification Search
CPC ......... G02F 1/136209; G02F 1/133512; G02F 1/133371; G02F 1/1337; G02F 1/1368; G02F 1/133707

See application file for complete search history.

(56) References Cited

U.S. PATENT DOCUMENTS

| 5,880,797 | A | * | 3/1999 | Yamada | ............ G02F 1/133377 349/84 |
| 6,927,820 | B2 | * | 8/2005 | Jang | .................. G02F 1/133512 257/E27.111 |
| 2002/0063841 | A1 | | 5/2002 | Hirakata et al. | |
| 2019/0265540 | A1 | | 8/2019 | Terada et al. | |

FOREIGN PATENT DOCUMENTS

| JP | 2005-121805 A | 5/2005 |
| JP | 2007-187720 A | 7/2007 |
| JP | 2011-186365 A | 9/2011 |
| JP | 2014-098914 A | 5/2014 |
| JP | 2019-148625 A | 9/2019 |

* cited by examiner

*Primary Examiner* — Dung T Nguyen
(74) *Attorney, Agent, or Firm* — Oliff PLC

(57) ABSTRACT

A liquid crystal device is provided with a first light-shielding member, a second light-shielding member, a third light-shielding member, and a fourth light-shielding member along an edge of a pixel electrode, and liquid crystal molecules are set with a pretilt direction (an alignment direction) in a direction intersecting both a first direction and a second direction and facing a second intersection region between the third light-shielding member and the fourth light-shielding member. In addition, at a lower layer side of the pixel electrode, a convex portion extending along an end portion of the pixel electrode is provided. The pixel electrode avoids overlapping, in a region along both the first light-shielding member and the second light-shielding member, with the convex portion, and overlaps, in a region along both the third light-shielding member and the fourth light-shielding member, with the convex portion.

10 Claims, 12 Drawing Sheets

LIQUID CRYSTAL DEVICE AND ELECTRONIC APPARATUS

The present application is based on, and claims priority from JP Application Serial Number 2019-215076, filed Nov. 28, 2019, the disclosure of which is hereby incorporated by reference herein in its entirety.

BACKGROUND

1. Technical Field

The present disclosure relates to a liquid crystal device and an electronic apparatus.

2. Related Art

A liquid crystal device includes a first substrate provided at one surface side with a plurality of pixel electrodes having translucency and a first alignment film covering the plurality of pixel electrodes, a second substrate provided with a second alignment film at a side of a surface facing the first substrate, and a liquid crystal layer provided between the first substrate and the second substrate. The end portions of the plurality of pixel electrodes each overlap with both a first light-shielding portion extending in a first direction and a second light-shielding portion extending in a second direction. In the liquid crystal device thus configured, a structure is suggested in which a size in the second direction of an opening portion enclosed by the first light-shielding portion and the second light-shielding portion is made smaller than the size in the first direction of the opening portion, and a width in the second direction of the first light-shielding portion is made wider than the width in the first direction of the second light-shielding portion (see JP 2019-148625 A). It is also suggested that a center of the pixel electrode is caused to deviate, in a direction along the second direction, from the center of the opening portion in a pretilt orientation of liquid crystal molecules. According to such a configuration, even when an alignment of the liquid crystal molecules is disturbed due to an influence of a lateral electric field generated between the respective adjacent pixel electrodes in the second direction, a range in which a region where such a disturbance has occurred overhangs from the second light-shielding portion can be narrowed, to thus suppress a reduction in the display quality, which is caused by the lateral electric field.

Unfortunately, the technology described in JP 2019-148625 A employs a structure in which a width of the light-shielding portion at a part where the disturbance in the alignment due to the lateral electric field occurs is widened to mask the influence of the lateral electric field, which results in the widening of the width of the light-shielding portion in order to ensure the masking of the disturbance in the alignment due to the lateral electric field. This results in a reduction in the display light amount. Thus, in the configuration described in JP 2019-148625 A, there is an issue of being unable to appropriately suppress the reduction in the image quality, which is caused by the disturbance in the alignment of the liquid crystal molecules due to the lateral electric field.

SUMMARY

In order to resolve the above-described issue, a liquid crystal device according to an aspect of the present disclosure includes a liquid crystal layer containing liquid crystal molecules, a first light-shielding member extending along a first direction, a second light-shielding member extending along a second direction intersecting the first direction, a third light-shielding member intersecting the second light-shielding member and extending along the first direction, a fourth light-shielding member intersecting both the first light-shielding member and the third light-shielding member, and extending along the second direction, a transistor provided corresponding to an intersection region between the third light-shielding member and the fourth light-shielding member, a pixel electrode provided corresponding to the transistor and provided such that portions of the pixel electrode extend along the first light-shielding member, the second light-shielding member, the third light-shielding member, and the fourth light-shielding member respectively, and an insulating member having a convex portion provided along the end portion of the pixel electrode at a layer between the first light-shielding member, the second light-shielding member, the third light-shielding member, and the fourth light-shielding member, and the pixel electrode, in which the liquid crystal molecules have, in a region in which the pixel electrode is provided when viewed in plan view, an alignment direction set to be a direction intersecting both the first direction and the second direction and facing the intersection region, and in which the pixel electrode is provided in a manner avoiding overlapping with the convex portion in a region along the first light-shielding member and the second light-shielding member and overlapping with the convex portion in a region along the third light-shielding member and the fourth light-shielding member.

The liquid crystal device according to an aspect of the present disclosure can be used for various types of electronic apparatuses.

BRIEF DESCRIPTION OF THE DRAWINGS

FIG. 10 is an explanatory view illustrating advantageous effects of a convex portion on a lateral electric field illustrated in FIG. 7 and the like.

DESCRIPTION OF EXEMPLARY EMBODIMENTS

Embodiments of the present disclosure will be described below with reference to the drawings. The drawings to be referenced below are appropriately scaled up or down or otherwise exaggerated to allow portions that is to be described to be put into a recognizable state. In addition, other components than components necessary to be described may occasionally be omitted. Further, in the description below, the phrase "when viewed in plan view" represents a state viewed from the normal direction with respect to both a first substrate 10 and a pixel electrode 9a.

Embodiment 1

Configuration of Liquid Crystal Device

Figure 1:
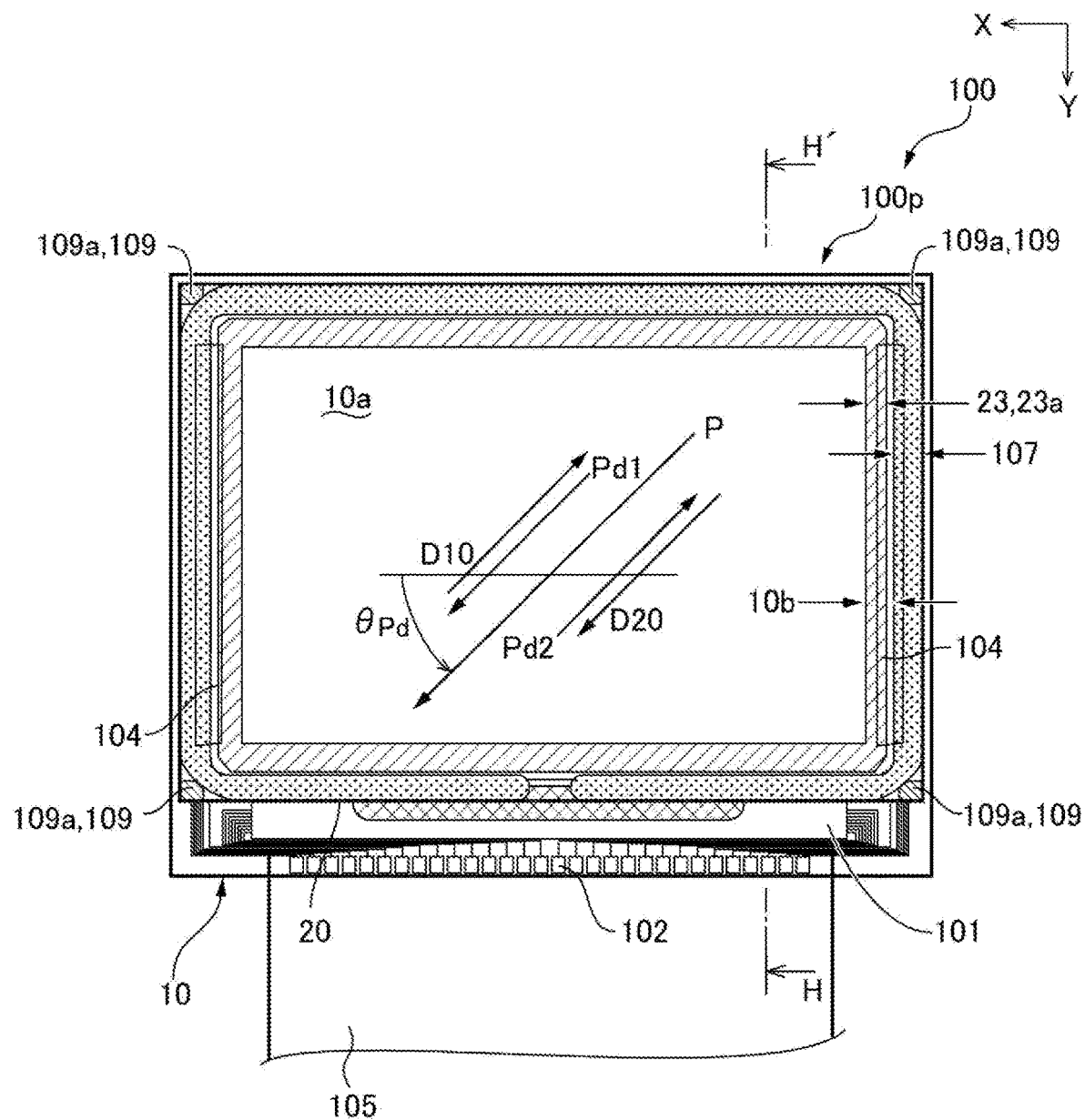
FIG. 1 is a plan view illustrating one aspect of a liquid crystal device according to Embodiment 1 of the present disclosure.
Figure 2:
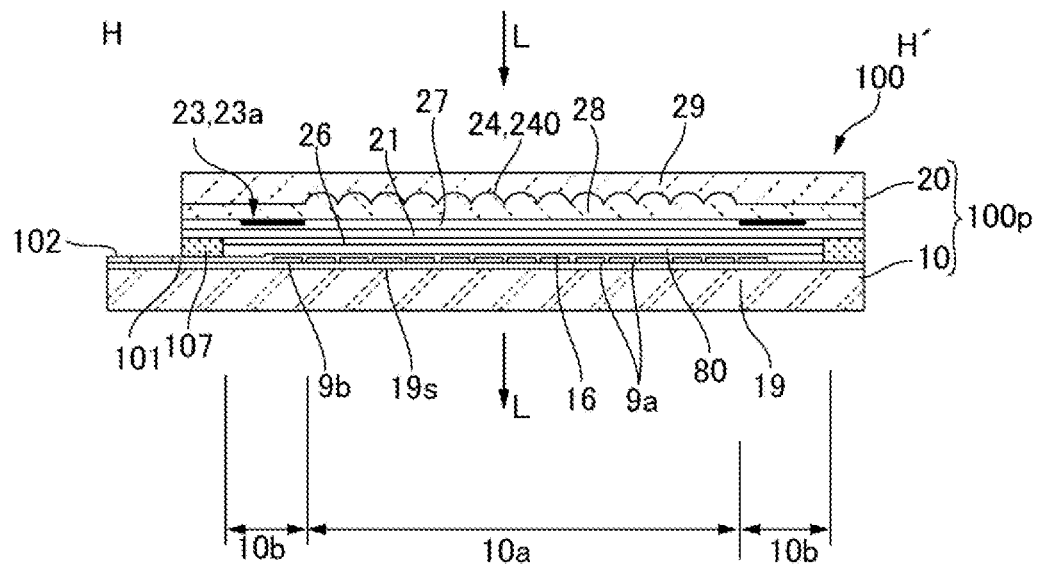
FIG. 2 is an H-H' cross-sectional view of a liquid crystal device illustrated in FIG. 1.

FIG. 1 is a plan view illustrating one aspect of a liquid crystal device 100 according to Embodiment 1 of the present disclosure, and illustrates a state where the liquid crystal device 100 is viewed from a side of a second substrate 20. FIG. 2 is an H-H' cross-sectional view of the liquid crystal device 100 illustrated in FIG. 1.

As illustrated in FIGS. 1 and 2, the liquid crystal device 100 includes a liquid crystal panel 100p including the first substrate 10 having translucency and the second substrate 20 having translucency that are bonded together by a seal material 107 with a predetermined gap in between. The seal material 107 is provided, in a frame shape, in conformance with an outer edge of the second substrate 20, where a liquid crystal layer 80 is disposed in a region enclosed by the seal material 107 between the first substrate 10 and the second substrate 20.

The first substrate 10 and the second substrate 20 are both formed in a quadrangle shape. At a substantially center of the liquid crystal device 100, there is provided a display region 10a as a rectangular region where a dimension in a three to nine o'clock direction (a dimension in a first direction X) is longer than a dimension in a zero to six o'clock direction (a dimension in a second direction Y). In conformance with such shapes, the seal material 107 is also provided in a substantially rectangular flame-shape, where a circumferential region 10b having a rectangular frame-shape is provided between an inner circumferential edge of the seal material 107 and an outer circumferential edge of the display region 10a.

The first substrate 10 includes a substrate main body 19 having translucency, which is formed of a material such as quartz or glass. At a side of a surface (a one surface 10s) of the first substrate 10, which faces the second substrate 20, a data-line driving circuit 101 and a plurality of terminals 102 are formed, at the outside of the display region 10a, along one side extending in the first direction X at the six o'clock side of the first substrate 10, and scanning-line driving circuits 104 are formed along respective two sides extending in the second direction Y of the first substrate 10. The terminal 102 is coupled with a flexible wiring substrate 105, where via the flexible wiring substrate 105, the first substrate 10 is input with various potentials and various signals.

In the display region 10a on a side of the one surface 10s of the first substrate 10, a plurality of the pixel electrodes 9a having translucency and constituted by a transmissive conductive film such as Indium Tin Oxide (ITO) film or the like and transistors for pixel switching (not illustrated) electrically coupled to each of the plurality of the pixel electrodes 9a are formed in a matrix pattern. A first alignment film 16 is formed on the pixel electrodes 9a at a side of the second substrate 20. Thus, the first substrate 10 corresponds to from the substrate main body 19 to the first alignment film 16.

The second substrate 20 includes a substrate main body 29 having translucency formed of a material such as quartz or glass. At a side of a surface (a one surface 20s) of the second substrate 20, which faces the first substrate 10, a common electrode 21 having translucency and constituted by an ITO film and the like is formed, where a second alignment film 26 is formed on the common electrode 21 at a side of the first substrate 10. Thus, the second substrate 20 corresponds to from the substrate main body 29 to the second alignment film 26. The common electrode 21 is formed at the substantially entire surface of the second substrate 20.

At an opposite side of the common electrode 21 from the first substrate 10, there are formed a light-shielding film 23 having light-shielding properties, which is composed of a metal, a metal compound, or the like, and a protective film 27 having translucency. The light-shielding film 23 is formed, for example, as a partition 23a having a frame shape, which extends along the outer circumferential edge of the display region 10a. The light-shielding film 23 may occasionally be formed in a black matrix having a lattice shape in regions overlapping in plan view with regions each interposed between the respective adjacent pixel electrodes 9a. In a region overlapping in plan view with the partition 23a in the circumferential region 10b of the first substrate 10, there are formed dummy pixel electrodes 9b that are formed simultaneously with the pixel electrodes 9a.

At the second substrate 20, there are formed lenses 24 each facing each of the plurality of the pixel electrodes 9a. Accordingly, at the substrate main body 29, a lens surface having a concave curved surface 240 is formed, where the concave curved surface 240 is covered with a lens layer 28. The lens layer 28 has a refractive index greater than the refractive index of the substrate main body 29. For example, the lens layer 28 is constituted by a silicon oxynitride film (SiON) and has the refractive index from 1.58 to 1.68, while the substrate main body 19 is constituted by a quartz substrate (silicon oxide, SiO2) and has the refractive index of 1.48. The lenses 24 therefore have positive power for converging light. In Embodiment 1, the light-shielding film 23 and the protective film 27 are formed on the lens layer 28 at the side of the first substrate 10.

The first substrate 10 is formed, in a region outside of the seal material 107 and overlapping with a corner part of the second substrate 20, with an inter-substrate conduction electrode 109 for establishing an electrical conduction between the first substrate 10 and the second substrate 20. There is disposed, at the inter-substrate conduction electrode 109, an inter-substrate conduction material 109a containing conductive particles, where via the inter-substrate conduction material 109a and the inter-substrate conduction electrode 109, the common electrode 21 of the second substrate 20 is electrically coupled to the side of the first substrate 10. Accordingly, a common potential is applied to the common electrode 21 from the side of the first substrate 10.

The liquid crystal device 100 of Embodiment 1 is configured as a transmissive-type liquid crystal device. In the transmissive-type liquid crystal device, light being incident from a substrate on one side between the first substrate 10 and the second substrate 20, while passing through the substrate on the other side to be emitted, is modulated to display an image. In Embodiment 1, as indicated by an arrow L in FIG. 2, light being incident from a side of the second substrate 20, while passing through the first substrate 10 to be emitted, is modulated by the liquid crystal layer 80 for each of the pixels to display an image.

Electrical Configuration of Liquid Crystal Device 100

Figure 3:
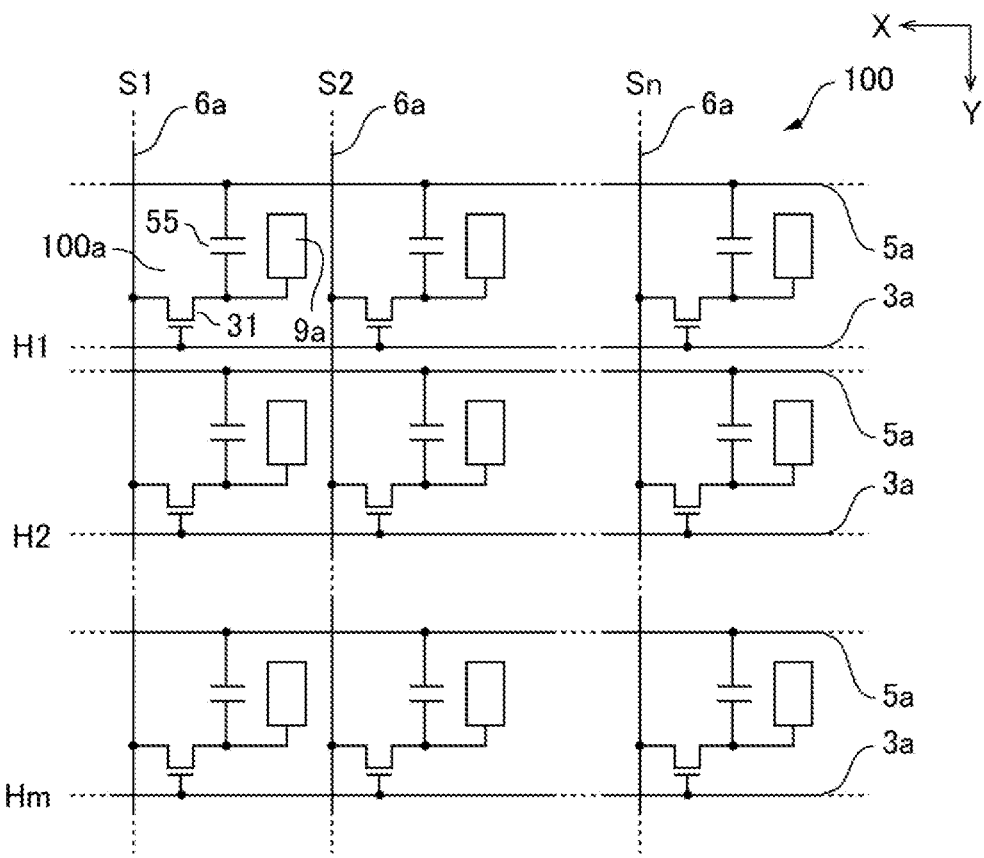
FIG. 3 is an explanatory view illustrating an electrical configuration of a liquid crystal device illustrated in FIG. 1.

FIG. 3 is an explanatory view illustrating an electrical configuration of the liquid crystal device 100 illustrated in FIG. 1. As illustrated in FIG. 3, in the display region 10a of the liquid crystal device 100, each of a plurality of pixels 100a that are formed in a matrix pattern is formed with the pixel electrode 9a and a transistor 31 corresponding to the pixel electrode 9a, where sources of the transistors 31 are coupled with data lines 6a for supplying image signals S1, S2, . . . and Sn. The image signals S1, S2, . . . and Sn to be written in the data lines 6a may be line-sequentially supplied in this order, or may also be supplied for each of groups each including respective plurality of the data lines 6a that are adjacent to each other. Gates of the transistors 31 are electrically coupled with scanning lines 3a, where the scanning signals H1, H2, . . . and Hm are line-sequentially applied to the scanning lines 3a in a pulse in this order at a predetermined timing. The pixel electrodes 9a are electrically coupled to drains of the transistors 31, and configured to write the image signals S1, S2, . . . and Sn that are supplied from the data lines 6a in each of the pixels 100a at a predetermined timing by turning the transistors 31 into the ON state for a certain time period. In this way, the image signals S1, S2, . . . and Sn that have been in the pixels 100a via the pixel electrodes 9a are retained for a certain time period together with the common electrode 21 of the second substrate 20, which is described with reference to FIG. 2. In the liquid crystal layer 80, an alignment and order of molecular assembly are changed in accordance with a level of voltage to be applied, and accordingly, the liquid crystal layer 80 is configured to modulate light to enable gradation display. As a consequence, rays of light having contrast commensurate with the image signals S1, S2, . . . and Sn are emitted from the liquid crystal device 100.

Here, in some cases, in order to prevent a leakage of the image signals S1, S2, . . . and Sn retained for each of the pixels 100a, a retention capacitor 55 may be additionally provided parallel to a liquid crystal capacity formed between the pixel electrode 9a and the common electrode 21 by utilizing capacitor lines 5a. In this case, the voltage of the pixel electrode 9a is retained by the retention capacitor 55 for a time period that is longer than the time period for which the source voltage is applied. This improves a charge retention property, to achieve the liquid crystal device 100 of an active matrix type with high contrast ratio.

Configuration of Liquid Crystal Layer 80 and Other Components

Figure 4:
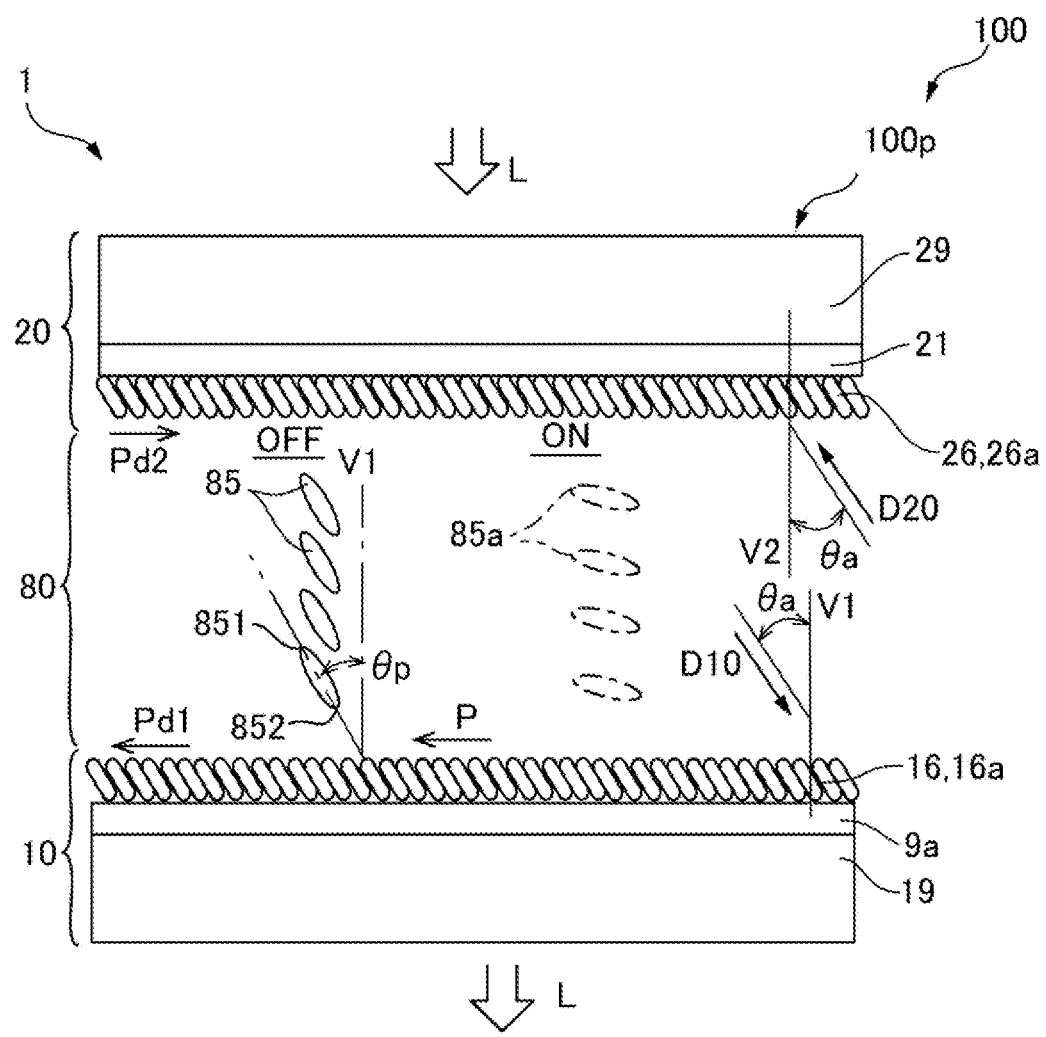
FIG. 4 is an explanatory view illustrating liquid crystal molecules and others used for a liquid crystal device illustrated in FIG. 1.

FIG. 4 is an explanatory view illustrating liquid crystal molecules 85 and others used for the liquid crystal device 100 illustrated in FIG. 1. In FIG. 4, the first alignment film 16 and the second alignment film 26 are constituted by a polyimide film or an inorganic alignment film. In Embodiment 1, the first alignment film 16 and the second alignment film 26 are formed as oblique deposition films (inorganic alignment films) containing a material such as $SiO_x$ ($x<2$), $SiO_2$, $TiO_2$, $MgO$, or $Al_2O_3$.

Thus, the first alignment film 16 and the second alignment film 26 are each constituted by a columnar structural body in which columnar bodies 16a or 26a each named column are obliquely formed with respect to both the first substrate 10 and the second substrate 20. Because of this, in the first alignment film 16 and the second alignment film 26, the liquid crystal molecules 85 having negative dielectric anisotropy and used in the liquid crystal layer 80 are oriented diagonally with respect to both the first substrate 10 and the second substrate 20 to allow the liquid crystal molecules 85 to be pretilted. In a state where no voltage is applied between the pixel electrodes 9a and the common electrode 21, a pretilt angle θp denotes an angle formed between a vertical direction (the normal direction) with respect to both the first substrate 10 and the second substrate 20, and a long axis direction (an alignment direction) in which the liquid crystal molecules 85 are aligned. The pretilt angle θp approximately ranges from 3 degrees to 5 degrees, for example.

A pretilt orientation Pd1 with respect to the first substrate 10 of the liquid crystal molecules 85 coincides with an orientation in which first end portions 851 on a side opposite to the first substrate 10 in the long axis direction of the liquid crystal molecules 85 and second end portions 852 on the side of the first substrate 10 of the liquid crystal molecules 85 are diagonally located. In the liquid crystal device 100 thus configured, the liquid crystal molecules 85 turn over in the pretilt orientation Pd1 when a drive voltage is applied between the pixel electrodes 9a and the common electrode 21. A pretilt orientation Pd2 of the liquid crystal molecules 85 with respect to the second substrate 20 is antiparallel to the pretilt orientation Pd1 of the liquid crystal molecules 85 with respect to the first substrate 10. Hereinafter, the pretilt orientation Pd1 is designated as the alignment direction (a pretilt direction P) in which the liquid crystal molecules 85 are aligned.

In this manner, the liquid crystal device 100 is configured as a liquid crystal device of a Vertical Alignment (VA) mode. Further, the liquid crystal device 100 is disposed between a pair of polarized light elements disposed in a crossed Nichol state to allow the pretilt orientation Pd1 as the pretilt direction to form an angle θPd of 45 degrees with respect to a transmission axis or an absorption axis of the pair of polarized light elements. Thus, a transmissivity with respect to incident light increases in accordance with a voltage applied to between the pixel electrode 9a and the common electrode 21 for each of the pixels, to display an image in normally black mode where the pixels in the liquid crystal device 100 wholly emit light at a degree of contrast in accordance with the image signal.

As illustrated in FIG. 1, in Embodiment 1, a vapor deposition direction D10 representing an orientation when forming the first alignment film 16 is oriented from 0730 o'clock to 0130 o'clock, where an angle formed by the vapor deposition direction D10 with a normal line V1 with respect to the first substrate 10 is θa (see FIG. 4). At that time, a direction in which the columnar bodies 16a grow is oriented from 0730 o'clock to 0130 o'clock. Thus, the pretilt orientation Pd1 as the pretilt direction with respect to the first substrate 10 of the liquid crystal molecules 85 is oriented from 0130 o'clock to 0730 o'clock. A vapor deposition direction D20 representing an orientation when forming the second alignment film 26 is oriented from 0130 o'clock to 0730 o'clock, where an angle formed by the vapor deposition direction D20 with a normal line V2 with respect to the second substrate 20 is θa (see FIG. 4). At that time, a direction in which the columnar bodies 26a grow is oriented from 0730 o'clock to 0130 o'clock. Thus, the pretilt orientation Pd2 with respect to the second substrate 20 of the liquid crystal molecules 85 is oriented from 0730 o'clock to 0130 o'clock. As a consequence, the pretilt orientations Pd1 and Pd2 of the liquid crystal molecules 85 intersect the first direction X and the second direction Y at an angle of 45 degrees, respectively. In Embodiment 1, the alignment direction (the pretilt direction P) in which the liquid crystal molecules 85 are aligned coincides with the direction along the pretilt orientations Pd1 and Pd2, and coincides with the direction in which 0130 o'clock and 0730 o'clock are linearly connected.

Specific Configuration of Pixel

Figure 5:
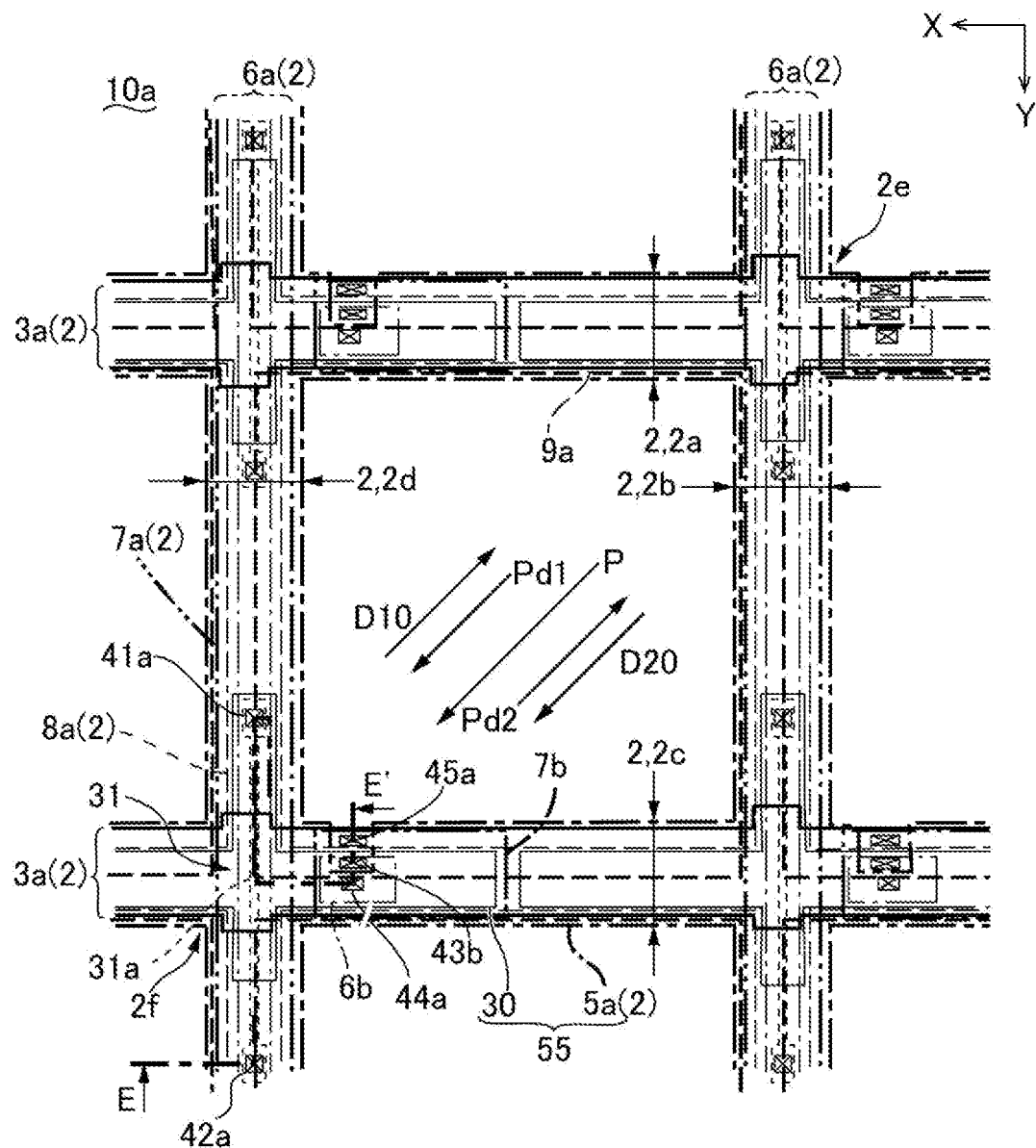
FIG. 5 is a plan view of a pixel in a liquid crystal device illustrated in FIG. 1.
Figure 6:
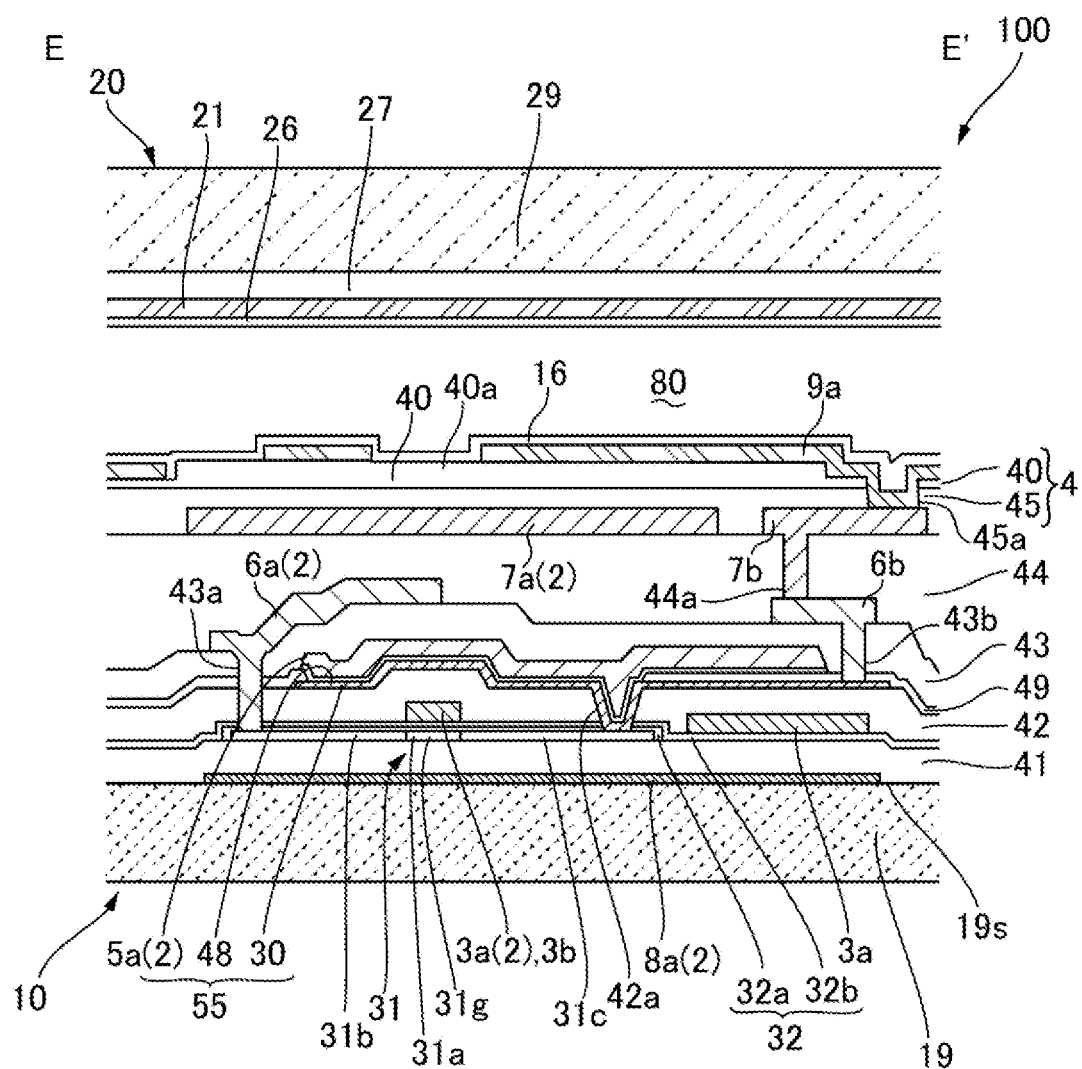
FIG. 6 is an E-E' cross-sectional view of a pixel illustrated in FIG. 5.

FIG. 5 is a plan view of a pixel in the liquid crystal device 100 illustrated in FIG. 1. FIG. 6 is an E-E' cross-sectional view of the pixel illustrated in FIG. 5. Note that in FIG. 5, the respective layers are indicated by lines described below. Also note that in FIG. 5, as for layers having end portions overlapping in plan view with each other, positions of the end portions are displaced to make shapes and the like of the layers easily recognizable.

A first light-shielding film 8a: a thin and long dash line
A semiconductor film 31a: a thin and short dotted line
The scanning line 3a: a thick solid line
A drain electrode 30: a thin solid line
The data line 6a and a relay electrode 6b: a thin alternate long and short dash line
The capacitor line 5a: a thick alternate long and short dash line
A second light-shielding film 7a and a relay electrode 7b: a thick alternate long and two short dashes line
The pixel electrode 9a: a thick dash line As illustrated in FIG. 5, at the side of the one surface 10s of the first substrate 10, the plurality of the pixel electrodes 9a are formed, where the data lines 6a and the scanning lines 3a are formed along an inter-pixel region interposed between the respective adjacent pixel electrodes 9a. The inter-pixel region extends lengthwise and crosswise, where the scanning lines 3a linearly extend along a first inter-pixel region extending in the first direction X of the inter-pixel region, and the data lines 6a linearly extend along a second inter-pixel region extending in the second direction Y of the inter-pixel region. Further, the transistor 31 and the pixel electrode 9a are formed corresponding to intersections between the data lines 6a and the scanning lines 3a, and the transistor 31 is formed by utilizing an intersection region between the data line 6a and the scanning line 3a and the vicinity of the intersection region. The capacitor lines 5a are formed at the first substrate 10, and a common potential Vcom is applied to such capacitor lines 5a. The capacitor lines 5a extend in a manner overlapping with both the scanning lines 3a and the data lines 6a, to be formed into a lattice shape. At an upper layer side of the transistor 31, the second light-shielding film 7a is formed, which extends in a manner overlapping with the data line 6a. At a lower layer side of the transistor 31, the first light-shielding film 8a is formed, which extends in a manner overlapping with both the scanning line 3a and the data line 6a.

In this manner, the first light-shielding film 8a, the scanning line 3a, the capacitor line 5a, the data line 6a, and the second light-shielding film 7a form a light-shielding member 2 having a lattice shape extending along end portions of the plurality of the pixel electrodes 9a.

As illustrated in FIG. 6, at the side of the one surface 10s of the first substrate 10, there is formed the first light-shielding film 8a constituted by a conductive film such as a conductive polysilicon film, a metal silicide film, a metal film, or a metal compound film. The first light-shielding film 8a is constituted by a light-shielding film that contains tungsten silicide (WSi), tungsten, titanium nitride, or the like, to suppress light from entering the semiconductor film 31a to cause an erroneous operation due to photoelectric current to occur at the transistor 31. The first light-shielding film 8a may be configured as a scanning line, where in this case, a configuration to be described later is prepared, in which a gate electrode 3b and the first light-shielding film 8a are brought into conduction with each other.

At an upper layer side of the first light-shielding film 8a of the first substrate 10, an inter-layer insulating film 41 having translucency constituted by, for example, a silicon oxide film is formed, where at an upper layer side of the inter-layer insulating film 41, the transistor 31 including the semiconductor film 31a is formed. The transistor 31 serves as a Thin Film Transistor (TFT), which includes the semiconductor film 31a and the gate electrode 3b, where the semiconductor film 31a has long sides oriented in an extending direction in which the data line 6a extends, and the gate electrode 3b extends in a direction orthogonal to a lengthwise direction of the semiconductor film 31a and overlaps with a central portion of the semiconductor film 31a in the lengthwise direction. In Embodiment 1, the gate electrode 3b is constituted by a part of the scanning line 3a. The transistor 31 includes a gate insulating layer 32 having translucency between the semiconductor film 31a and the gate electrode 3b. The semiconductor film 31a includes a channel region 31g facing the gate electrode 3b with the gate insulating layer 32 interposed in between, as well as includes a source region 31b and a drain region 31c at both sides of the channel region 31g. The transistor 31 has an LDD structure. Thus, at the both sides of the channel region 31g, the source region 31b and the drain region 31c each have a low-concentration region, where in a region adjacent to the low-concentration region at an opposite side of the channel region 31g, the source region 31b and the drain region 31c each have a high-concentration region.

The semiconductor film 31a is constituted by a polysilicon film (polycrystalline silicon film) and the like. The gate insulating layer 32 has a two-layer structure including a first gate insulating layer 32a constituted by a silicon oxide film formed by thermally oxidizing the semiconductor film 31a and a second gate insulating layer 32b constituted by a silicon oxide film formed by low pressure CVD method or the like. The gate electrode 3b and the scanning line 3a are constituted by a conductive film such as a conductive polysilicon film, a metal silicide film, a metal film, or a metal compound film.

At an upper layer side of the gate electrode 3b, an inter-layer insulating film 42 having translucency constituted by, for example, a silicon oxide film is formed, where at an upper layer of the inter-layer insulating film 42, the drain electrode 30 is formed. The drain electrode 30 is constituted by a conductive film such as a conductive polysilicon film, a metal silicide film, a metal film, or a metal compound film. The drain electrode 30 is formed in a manner partially overlapping with the drain region 31c of the semiconductor film 31a, and is brought into conduction with the drain region 31c via a contact hole 42a passing through both the inter-layer insulating film 42 and the gate insulating layer 32.

At an upper layer side of the drain electrode 30, an etching stopper film 49 having translucency constituted by, for example, a silicon oxide film, and a dielectric film 48 having translucency are formed, where at an upper layer side of such a dielectric film 48, the capacitor line 5a is formed. As the dielectric film 48, a silicon compound film such as a silicon oxide film or a silicon nitride film can be used, and in addition to these films, a dielectric film having a high-dielectric constant can be used, such as an aluminum oxide film, a titanium oxide film, a tantalum oxide film, a niobium oxide film, a hafnium oxide film, a lantern oxide film, and a zirconium oxide film. The capacitor line 5a is constituted by a conductive film such as a conductive polysilicon film, a metal silicide film, a metal film, or a metal compound film. The capacitor line 5a overlaps with the drain electrode 30 with the dielectric film 48 interposed in between, and constitutes the retention capacitor 55.

At an upper layer side of the capacitor line 5a, an inter-layer insulating film 43 having translucency constituted by a silicon oxide film or the like is formed, where at an upper layer side of such an inter-layer insulating film 43, the data line 6a and the relay electrode 6b are formed of an identical conductive film. The data line 6a and the relay electrode 6b are constituted by a conductive film such as a conductive polysilicon film, a metal silicide film, a metal film, or a metal compound film. The data line 6a is brought into conduction with the source region 31b via a contact hole 43a passing through the inter-layer insulating film 43, the etching stopper film 49, the inter-layer insulating film 42, and the gate insulating layer 32. The relay electrode 6b is brought into conduction with the drain electrode 30 via a contact hole 43b passing through the inter-layer insulating film 43 and the etching stopper film 49.

At an upper layer side of the data line 6a and the relay electrode 6b, an inter-layer insulating film 44 having translucency constituted by, for example, a silicon oxide film is formed, where at an upper layer side of such an inter-layer insulating film 44, the second light-shielding film 7a and the relay electrode 7b are formed of an identical conductive film. The inter-layer insulating film 44 has a flattened surface. The second light-shielding film 7a and the relay electrode 7b are constituted by a conductive film such as a conductive polysilicon film, a metal silicide film, a metal film, or a metal compound film. The relay electrode 7b is brought into conduction with the relay electrode 6b via a contact hole 44a passing through the inter-layer insulating film 44. The second light-shielding film 7a extends in a manner overlapping with the data line 6a. Note that the second light-shielding film 7a may be brought into conduction with the capacitor line 5a to be utilized as a shielding layer.

At an upper layer side of the second light-shielding film 7a and the relay electrode 7b, a first insulating film 45 having translucency constituted by, for example, a silicon oxide film is formed, where at an upper layer side of the first insulating film 45, the pixel electrode 9a constituted by an ITO film is formed. A contact hole 45a reaching the relay electrode 7b is formed in the first insulating film 45, where via the contact hole 45a, the pixel electrode 9a is electrically coupled to the relay electrode 7b. This allows the pixel electrode 9a to be electrically coupled to the drain region 31c via the relay electrode 7b, the relay electrode 6b, and the drain electrode 30. The first insulating film 45 has a flattened surface. The first alignment film 16 is formed at a side of a surface of the pixel electrode 9a.

In Embodiment 1, a second insulating film 40 having translucency is formed between the pixel electrode 9a and the first insulating film 45, where the first insulating film 45 and the second insulating film 40 constitute an insulating member 4.

Layout of Light-Shielding Member 2 and Others

Figure 7:
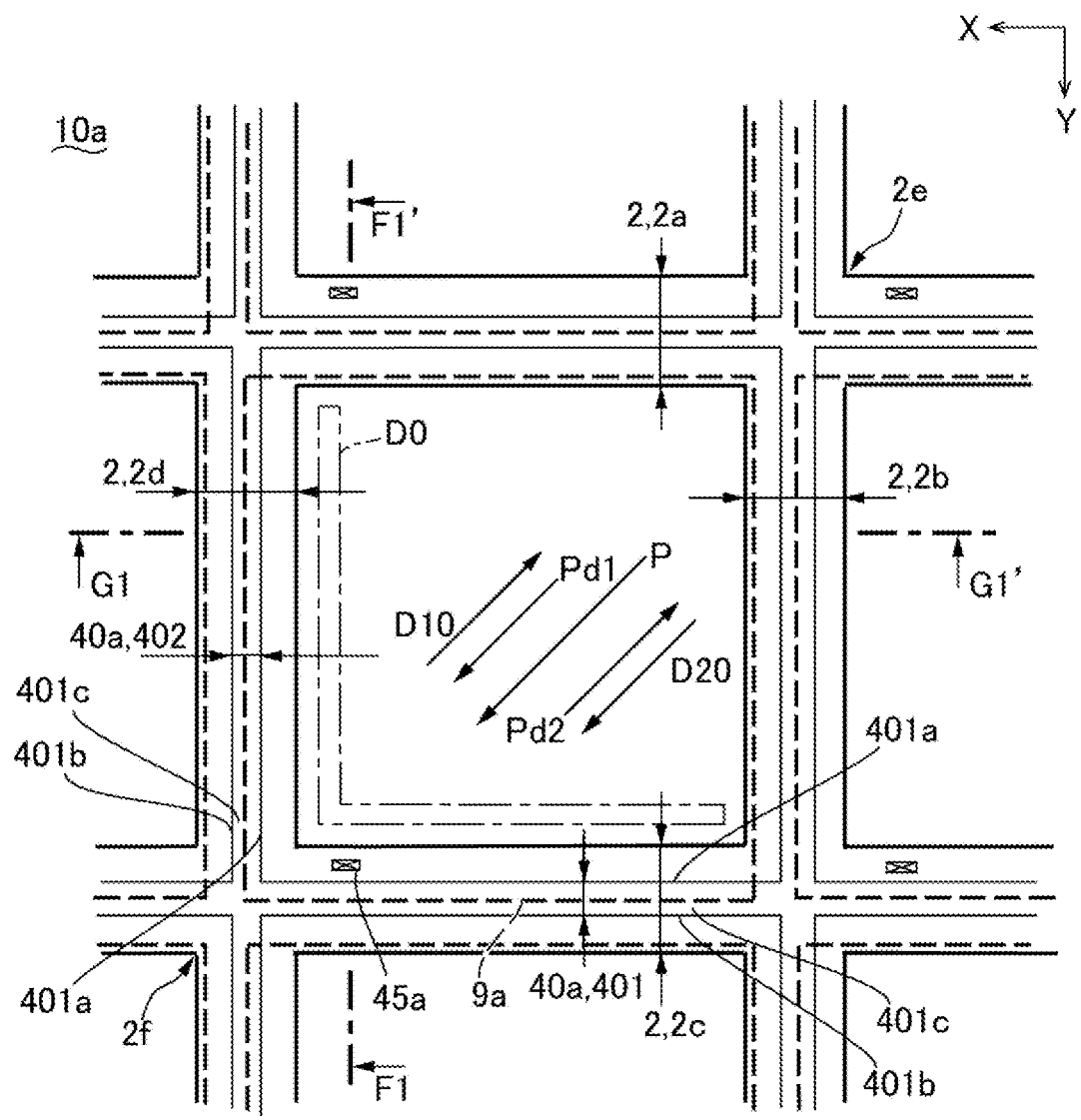
FIG. 7 is an explanatory view schematically illustrating a layout of a pixel electrode and a light-shielding member illustrated in FIG. 5.

FIG. 7 is an explanatory view schematically illustrating a layout of the light-shielding member 2 illustrated in FIG. 5. Note that in FIG. 7, the respective layers are indicated by lines described below. Also, in a known liquid crystal device that does not have a convex portion 40a to be described later, a portion D0 at which a domain easily occurs is indicated by a thin alternate long and short dash line.

The light-shielding member 4: a thick solid line
The pixel electrode 9a: a thick dash line
The convex portion 40a: a thin solid line As illustrated in FIG. 6, the light-shielding member 2 constituted by the first light-shielding film 8a, the scanning line 3a, the capacitor line 5a, the data line 6a, and the second light-shielding film 7a are formed between the substrate main body 19 and the pixel electrode 9a, where the light-shielding member 2 extends in both the first direction X and the second direction Y along boundaries of the plurality of the pixel electrodes 9a.

Here, the plurality of the pixel electrodes 9a have an identical configuration. Thus, focusing attention on one pixel electrode 9a among the plurality of the pixel electrodes 9a, the light-shielding member 2 includes a first light-shielding member 2a extending in the first direction X and a second light-shielding member 2b extending in the second direction Y intersecting the first direction X, as illustrated in FIGS. 5 and 7. The light-shielding member 2 also includes a third light-shielding member 2c intersecting the second light-shielding member 2b and extending along the first direction X, and a fourth light-shielding member 2d intersecting both the first light-shielding member 2a and the third light-shielding member 2c and extending along the second direction Y.

As a consequence, when an intersection region between the first light-shielding member 2a and the second light-shielding member 2b is designated as a first intersection region 2e, and an intersection region between the third light-shielding member 2c and the fourth light-shielding member 2d is designated as a second intersection region 2f, the alignment direction (the pretilt direction P) in which the liquid crystal molecules 85 are aligned, which is described with reference to FIGS. 1 and 4, coincides, in a region in which the pixel electrode 9a is provided when viewed in plan view, with a direction intersecting both the first direction X and the second direction Y and facing the second intersection region 2f. Here, the first intersection region 2e is a region where the first light-shielding member 2a and the second light-shielding member 2b are extended to overlap in plan view with each other, and the second intersection region 2f is a region where the third light-shielding member 2c and the fourth light-shielding member 2d are extended to overlap in plan view with each other. In addition, the transistor 31 is provided corresponding to the second intersection region 2f, and the pixel electrode 9a is provided corresponding to the transistor 31.

In Embodiment 1, the pixel electrode 9a partially overlaps in plan view with both the first light-shielding member 2a and the second light-shielding member 2b. The pixel electrode 9a also partially overlaps in plan view with both the third light-shielding member 2c and the fourth light-shielding member 2d. Thus, the end portions of the pixel electrode 9a overlap in plan view with any of the first light-shielding member 2a, the second light-shielding member 2b, the third light-shielding member 2c, and the fourth light-shielding member 2d.

The first light-shielding member 2a is equal in width (a dimension in a direction intersecting the extending direction) to the third light-shielding member 2c, and the second light-shielding member 2b is equal in width to the fourth light-shielding member 2d. In Embodiment 1, the first light-shielding member 2a, the second light-shielding member 2b, the third light-shielding member 2c, and the fourth light-shielding member 2d are all equal in width to one another.

In Embodiment 1, the semiconductor film 31a of the transistor 31 at least partially overlaps in plan view with the second intersection region 2f between the third light-shielding member 2c and the fourth light-shielding member 2d. The semiconductor film 31a also overlaps in its entirety with one of the third light-shielding member 2c or the fourth light-shielding member 2d. Thus, the contact hole 45a for electrically coupling the pixel electrode 9a with the transistor 31 is provided at a position overlapping in plan view with the third light-shielding member 2c. In Embodiment 1, the semiconductor film 31a linearly extends in the second direction Y in a manner overlapping in plan view with the data line 6a, thus, the semiconductor film 31a overlaps in its entirety with the light-shielding member 2 when viewed in plan view.

Note that an aspect in which the semiconductor film 31a linearly extends in the first direction X in a manner overlapping in plan view with the scanning line 3a or an aspect in which the semiconductor film 31a is bent at an intermediate position in the lengthwise direction may be employed. In this case as well, the semiconductor film 31a overlaps in plan view with the light-shielding member 2, and the semiconductor film 31a at least partially overlaps in plan view with the second intersection region 2f between the third light-shielding member 2c and the fourth light-shielding member 2d.

Configuration of Convex Portion 40a

Figure 8:
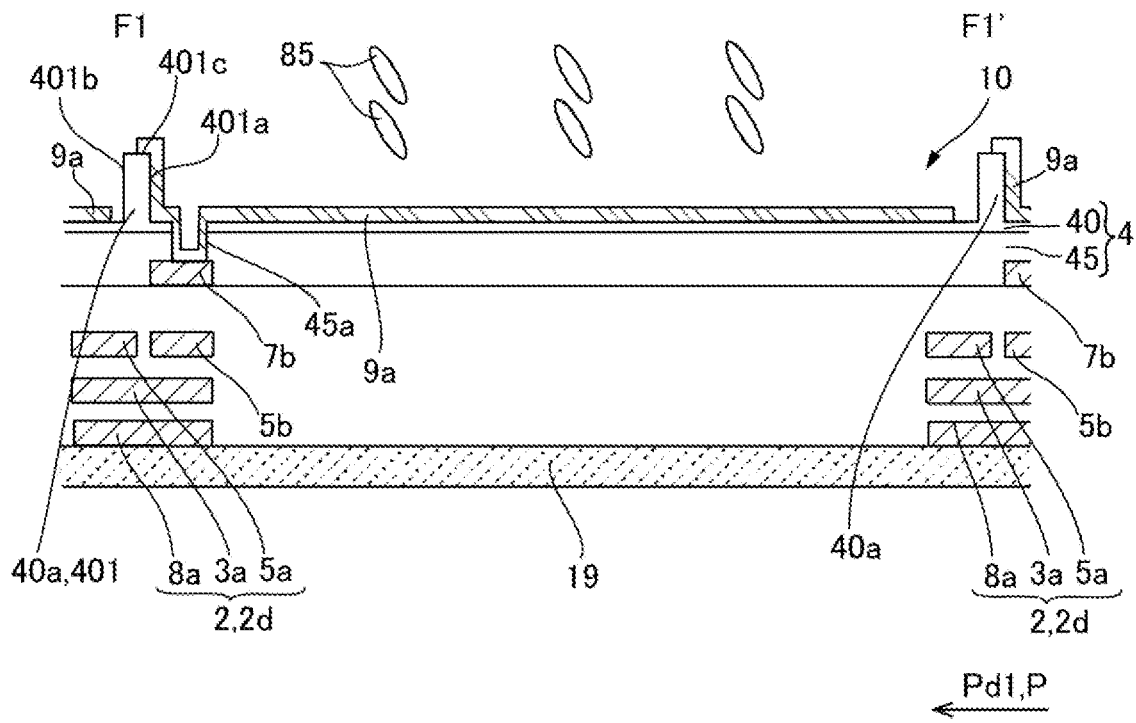
FIG. 8 is an explanatory view schematically illustrating an F1-F1' cross section illustrated in FIG. 7.
Figure 9:
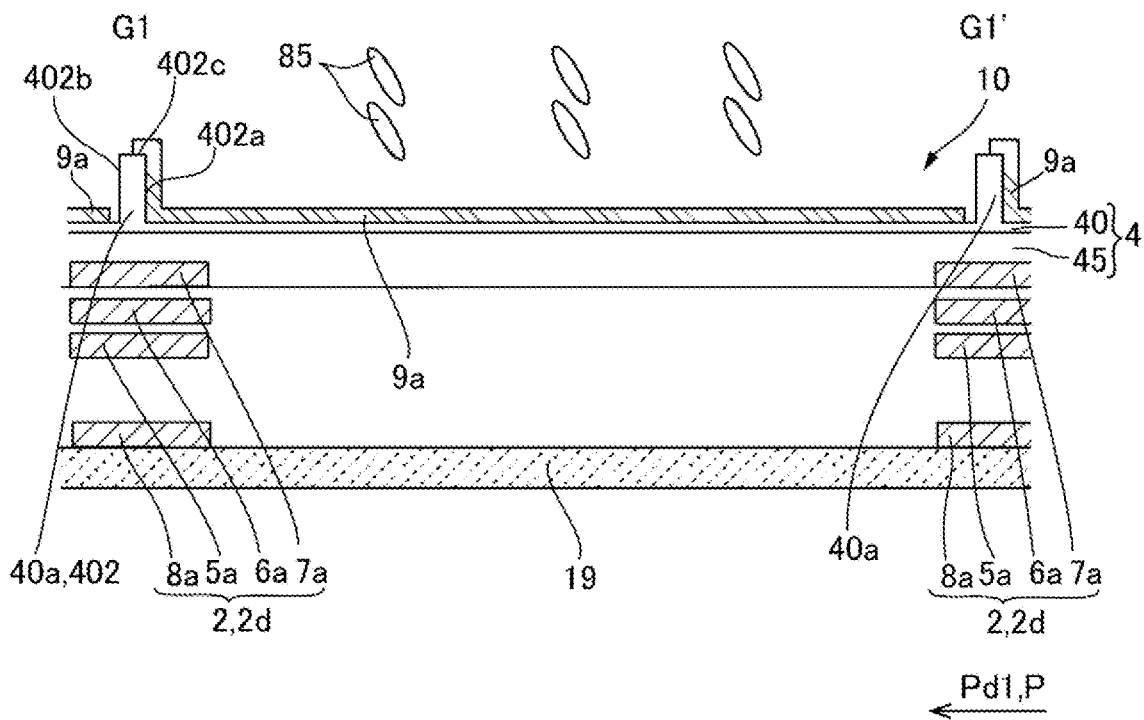
FIG. 9 is an explanatory view schematically illustrating a G1-G1' cross section illustrated in FIG. 7.

FIG. 8 is an explanatory view schematically illustrating an F1-F1' cross section illustrated in FIG. 7. FIG. 9 is an explanatory view schematically illustrating a G1-G1' cross section illustrated in FIG. 7. Note that in FIGS. 8 and 9, the liquid crystal molecules 85 are also illustrated in order to make a relationship with the alignment direction in which the liquid crystal molecules 85 are aligned easily recognizable.

As illustrated in FIGS. 6 and 7, at a layer between the pixel electrode 9a, and the first light-shielding member 2a, the second light-shielding member 2b, the third light-shielding member 2c, and the fourth light-shielding member 2d, there is provided the insulating member 4 having the convex portion 40a having a lattice shape extending in both the first direction X and the second direction Y along the end portion of the pixel electrode 9a. In Embodiment 1, the insulating member 4 includes the first insulating film 45, and the second insulating film 40 provided between the first insulating film 45 and the pixel electrode 9a, where the convex portion 40a is provided at the second insulating film 40. Thus, the contact hole 45a for electrically coupling the pixel electrode 9a with the transistor 31 is provided in a manner passing through the insulating member 4 (the first insulating film 45 and the second insulating film 40) at a position overlapping in plan view with the third light-shielding member 2c.

As illustrated in FIGS. 7, 8, and 9, the convex portion 40a extends at a center in a width direction of the first light-shielding member 2a, the second light-shielding member 2b, the third light-shielding member 2c, and the fourth light-shielding member 2d. Here, the pixel electrode 9a avoids overlapping with the convex portion 40a in a region along both the first light-shielding member 2a and the second light-shielding member 2b. In contrast, the pixel electrode 9a overlaps, in a region along both the third light-shielding member 2c and the fourth light-shielding member 2d, with the convex portion 40a. Thus, a width in which the pixel electrode 9a overlaps in the second direction Y with the third light-shielding member 2c is wider than a width in which the pixel electrode 9a overlaps in the second direction Y with the first light-shielding member 2a. Further, in the pixel electrode 9a, a width in which the pixel electrode 9a overlaps in the first direction X with the fourth light-shielding member 2d is wider than a width in which the pixel electrode 9a overlaps in the first direction X with the fourth light-shielding member 2d.

In Embodiment 1, the pixel electrode 9a is provided, in the region along both the third light-shielding member 2c and the fourth light-shielding member 2d, along only one side face of side faces on both sides in a width direction of the convex portion 40a, and is not provided along the other side face. More specifically, the pixel electrode 9a overlaps in the convex portion 40a with a first portion 401 overlapping with the third light-shielding member 2c at a part in a width direction of an end face 401c on a side of the liquid crystal layer 80 and only one side face 401a, and avoids overlapping with the other side face 401b. The pixel electrode 9a also overlaps in the convex portion 40a with a second portion 402 overlapping with the fourth light-shielding member 2d at a part in a width direction of an end face 402c on the side of the liquid crystal layer 80 and only one side face 402a, and avoids overlapping with the other side face 402b.

Advantageous Effects of Convex Portion 40a on Lateral Electric Field

Figure 10:
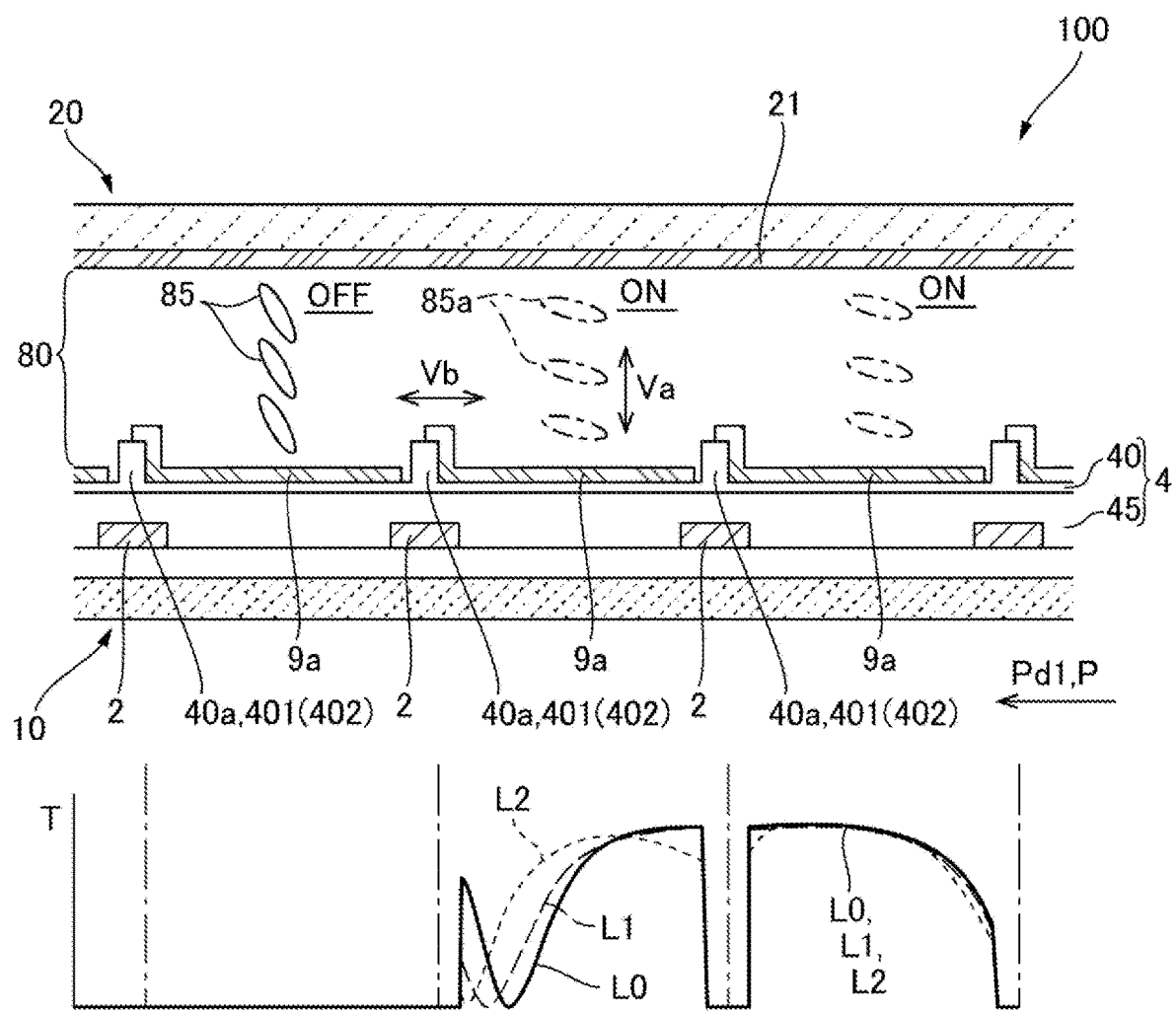

FIG. 10 is an explanatory view illustrating advantageous effects of the convex portion 40a on a lateral electric field illustrated in FIG. 7 and the like. As illustrated in FIG. 10, in the first substrate 10 of the liquid crystal device 100 of Embodiment 1, in an orientation corresponding to the alignment direction in which the liquid crystal molecules 85 are aligned, the pixel electrode 9a partially covers the convex portion 40a at the boundary with the respective adjacent pixels 100a. Accordingly, when driving the liquid crystal device 100, the influence of the lateral electric field hardly appears on an image between a pixel to which an OFF voltage is applied to the pixel electrode 9a and a pixel to which an ON voltage is applied to the pixel electrode 9a.

More specifically, it is assumed that a common potential applied to the common electrode 21 is set to 0V, and an OFF voltage of 0V is applied to the pixel electrode 9a of the pixel in the OFF state (black display) and an ON voltage of 5 V is applied to the pixel electrode 9a of the pixel in the ON state (white display). In this case, at the pixel in the ON state, the liquid crystal molecules 85 are significantly inclined from the normal direction with respect to the pixel electrode 9a by a vertical electric field (indicated by an arrow Va)

between the pixel electrode 9a and the common electrode 21. Here, when a lateral electric field (indicated by an arrow Vb) is generated between the pixel electrode 9a of the pixel in the ON state and the pixel electrode 9a of an adjacent pixel in the OFF state, an inclination of the liquid crystal molecules 85 decreases from the normal direction with respect to the pixel electrode 9a between the adjacent pixels, to generate a black region (a domain region) at a position indicated by the portion D0 in FIG. 7 of the pixel in the ON state. Hence, in Embodiment 1, the pixel electrode 9a covering the convex portion 40a enhances the vertical electric field (indicated by the arrow Va) between the pixel electrode 9a and the common electrode 21, while reduces the lateral electric field (indicated by the arrow Vb) between the pixel electrode 9a and an adjacent pixel electrode 9a. Also, the domain region receiving an influence from the lateral electric field shifts to a side of a boundary region of the pixel.

For example, in FIG. 10, a solid line L0, a long dash line L1, and a short dash line L2 indicate results of simulating a transmittance T at each of positions in the pixel when a thickness of the liquid crystal layer 80 is set to 2.1 um, and a height of the convex portion 40a is changed to 0 um, 0.15 um, and 0.35 um. When the convex portion 40a is not formed (when the height of the convex portion 40a is 0 um), the domain region in which the transmittance T has decreased due to an influence of the vertical electric field is generated at positions spaced apart from the adjacent pixel, where the domain region avoids overlapping with the light-shielding member 2, as indicated by the solid line L0.

In contrast, when the height of the convex portion 40a is 1.5 um, the domain region in which the transmittance T has decreased due to the influence of the vertical electric field shifts toward a side of the adjacent pixel, to cause a part of the domain region to overlap with the light-shielding member 2, as indicated by the long dash line L1. When the height of the convex portion 40a is 3.5 um, the domain region in which the transmittance T has decreased due to the influence of the vertical electric field further shifts to the side of the adjacent pixel, to cause substantially the entirety of the domain region to overlap with the light-shielding member 2, as illustrated by the short dash line L2. Thus, at the pixel in the ON state, the domain region in which the transmittance T has decreased due to the influence of the lateral electric field is to partially or entirely overlap with the light-shielding member 2.

Manufacturing Method for Liquid Crystal Device 100

Figure 11:
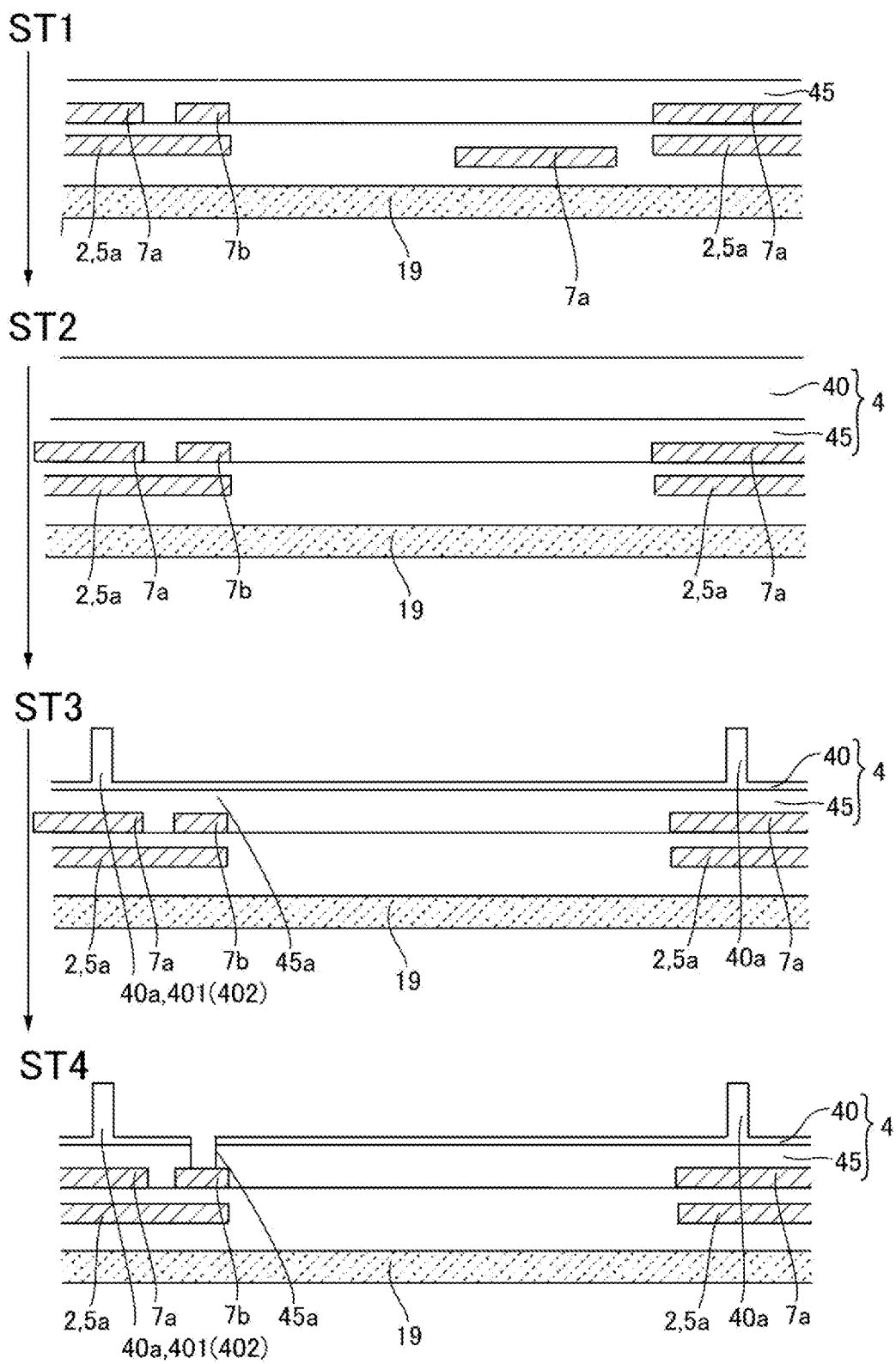
FIG. 11 is a process cross-sectional view illustrating a manufacturing process of a liquid crystal device illustrated in FIG. 1.

FIG. 11 is a process cross-sectional view illustrating a manufacturing process of the liquid crystal device 100 illustrated in FIG. 1, which illustrates a step for forming the contact hole 45a and the convex portion 40a.

First, in step ST1 illustrated in FIG. 11, components to the first insulating film 45 are formed. Next, in step ST2, the second insulating film 40 is overlaid on the first insulating film 45. The second insulating film 40 is a silicon oxide film that is formed by plasma CVD method using Tetraethylorthosilicate (TEOS), where the second insulating film 40 has a thickness that is greater than or equal to the height of the convex portion 40a. Next, in step ST3, the second insulating film 40 is etched to form the convex portion 40a in a state where an etching mask is formed at a surface of the second insulating film 40. In Embodiment 1, dry etching is performed in step ST3. Accordingly, a side face of the convex portion 40a forms a vertical surface that is perpendicular to the substrate main body 19, or an inclined surface that is inclined obliquely with respect to the substrate main body 19.

Next, in step ST4, in a state where another etching mask is formed at the surface of the second insulating film 40, a layered film (the insulating member 4) of the first insulating film 45 and the second insulating film 40 is etched to form the contact hole 45a illustrated in FIG. 6. Next, a transmissive conductive film such as an ITO film is formed by sputtering method or the like at the surface of the second insulating film 40, then the conductive film is patterned to form the pixel electrodes 9a illustrated in FIGS. 7 to 9.

Main Advantageous Effects of Embodiment 1

As described above, in the liquid crystal device 100 of Embodiment 1, the light-shielding member 2 extending along an edge of the pixel electrode 9a is formed at the first substrate 10, and the liquid crystal molecules 85 are set, in the region in which the pixel electrode 9a is provided when viewed in plan view, with the alignment direction (the pretilt direction P) in the direction intersecting both the first direction X and the second direction Y and facing the second intersection region 2f between the third light-shielding member 2c and the fourth light-shielding member 2d. Further, the insulating member 4 having the convex portion 40a extending along the end portion of the pixel electrode 9a is provided between the pixel electrode 9a, and the first light-shielding member 2a and the second light-shielding member 2b, where the pixel electrode 9a is provided in a manner avoiding overlapping, in the region along both the first light-shielding member 2a and the second light-shielding member 2b, with the convex portion 40a and overlapping, in the region along both the third light-shielding member 2c and the fourth light-shielding member 2d, with the convex portion 40a. Thus, in the regions along both the third light-shielding member 2c and the fourth light-shielding member 2d, the vertical electric field between the pixel electrode 9a and the common electrode 21 is intensified and the lateral electric field generated between the respective adjacent pixel electrodes 9a is weakened to such a degree that the pixel electrode 9a partially covers the convex portion 40a. In addition, the region where the lateral electric field is generated due to the influence of the adjacent pixel electrode 9a shifts to the side of the boundary region of the adjacent pixel electrode 9a. Thus, even when a disturbance has occurred in the alignment of the liquid crystal molecules 85 due to the influence of the lateral electric field, the influence of such a disturbance hardly appears on an image. As a consequence, according to Embodiment 1, the deterioration in the image quality caused by the disturbance in the alignment of the liquid crystal molecules 85 due to the lateral electric field can be appropriately suppressed, thus making it possible to display an image with high quality.

Further, even when the disturbance has occurred in the alignment of the liquid crystal molecules 85 due to the influence of the lateral electric field, the region where such a disturbance has occurred partially or entirely overlaps with both the third light-shielding member 2c and the fourth light-shielding member 2d. Accordingly, even when the disturbance has occurred in the alignment of the liquid crystal molecules 85 due to the influence of the lateral electric field, such a disturbance can be masked by both the third light-shielding member 2c and the fourth light-shielding member 2d. Thus, the influence of the disturbance in the alignment of the liquid crystal molecules 85 hardly appears on the image. As a consequence, according to Embodiment 1, the deterioration in the image quality caused by the disturbance in the alignment of the liquid crystal molecules 85 due to the lateral electric field can be appropriately suppressed, thus making it possible to display an image with high quality.

Also, the pixel electrode 9a overlaps, in the region overlapping with both the third light-shielding member 2c and the fourth light-shielding member 2d, with the convex portion 40a. As a resulted of this, the width in which the pixel electrode 9a overlaps in the second direction Y with the third light-shielding member 2c is wider than the width in which the pixel electrode 9a overlaps in the second direction Y with the first light-shielding member 2a, and the width in which the pixel electrode 9a overlaps in the first direction X with the fourth light-shielding member 2d is wider than the width in which the pixel electrode 9a overlaps in the first direction X with the second light-shielding member 2b. Thus, even when the disturbance has occurred in the alignment of the liquid crystal molecules 85 due to the influence of the lateral electric field at sides of the third light-shielding member 2c and the fourth light-shielding member 2d, a wide range in the region where such a disturbance has occurred overlaps with both the third light-shielding member 2c and the fourth light-shielding member 2d. Accordingly, even when the disturbance has occurred in the alignment of the liquid crystal molecules 85 due to the influence of the lateral electric field, the influence of such a disturbance hardly appears on the image. As a consequence, according to Embodiment 1, an image with high quality can be displayed.

In addition, the width in which the pixel electrode 9a overlaps in the second direction Y with the third light-shielding member 2c is wider than the width in which the pixel electrode 9a overlaps in the second direction Y with the first light-shielding member 2a. Thus, even when providing the semiconductor film of the transistor 31 for pixel switching in a manner overlapping with the second intersection region 2f between the third light-shielding member 2c and the fourth light-shielding member 2d, the pixel electrode 9a can be provided with the contact hole 45a for electrically coupling the transistor 31 with the pixel electrode 9a in the region overlapping with the third light-shielding member 2c.

Embodiment 2

Figure 12:
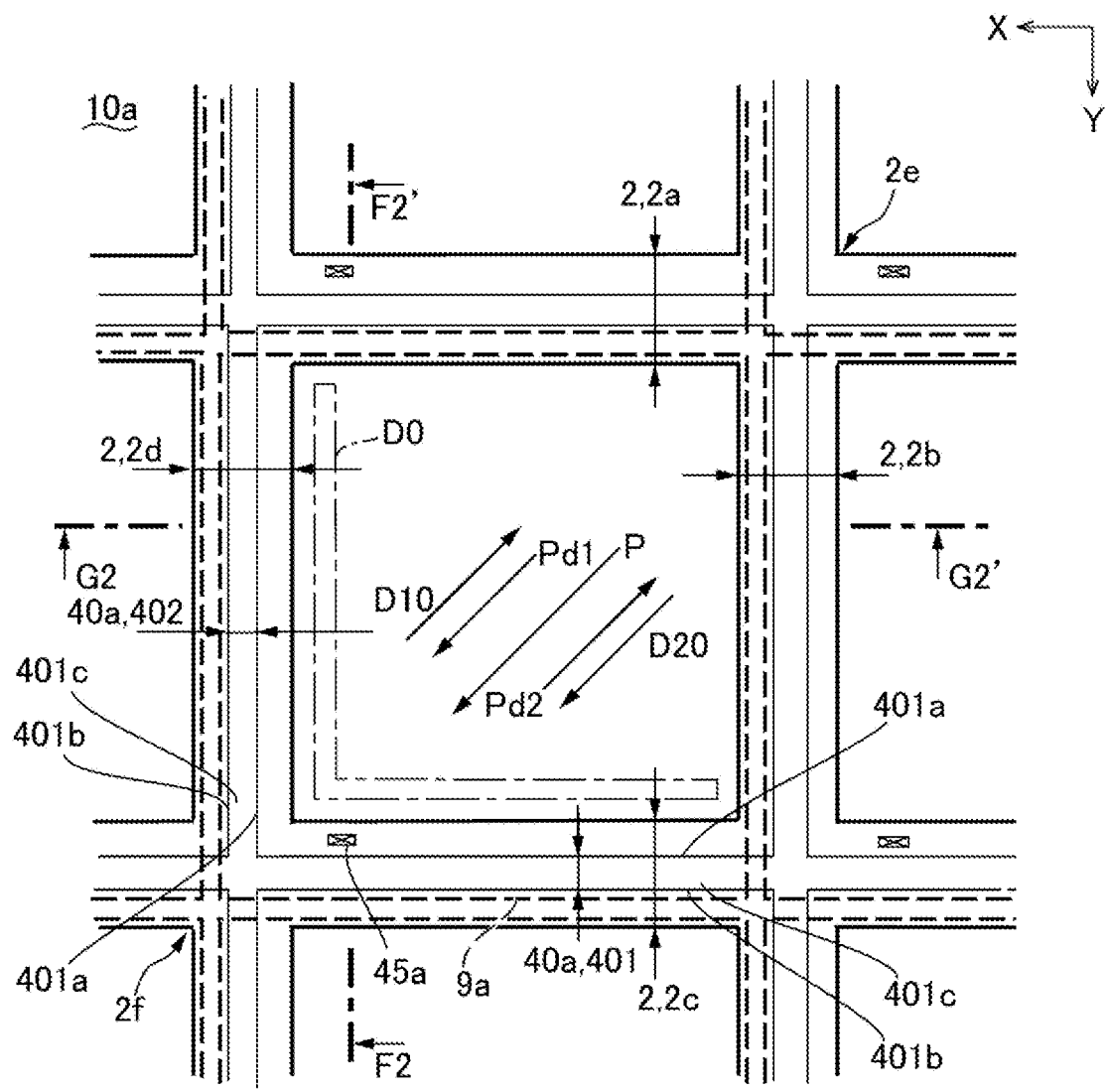
FIG. 12 is an explanatory view of a liquid crystal device according to Embodiment 2 of the present disclosure.
Figure 13:
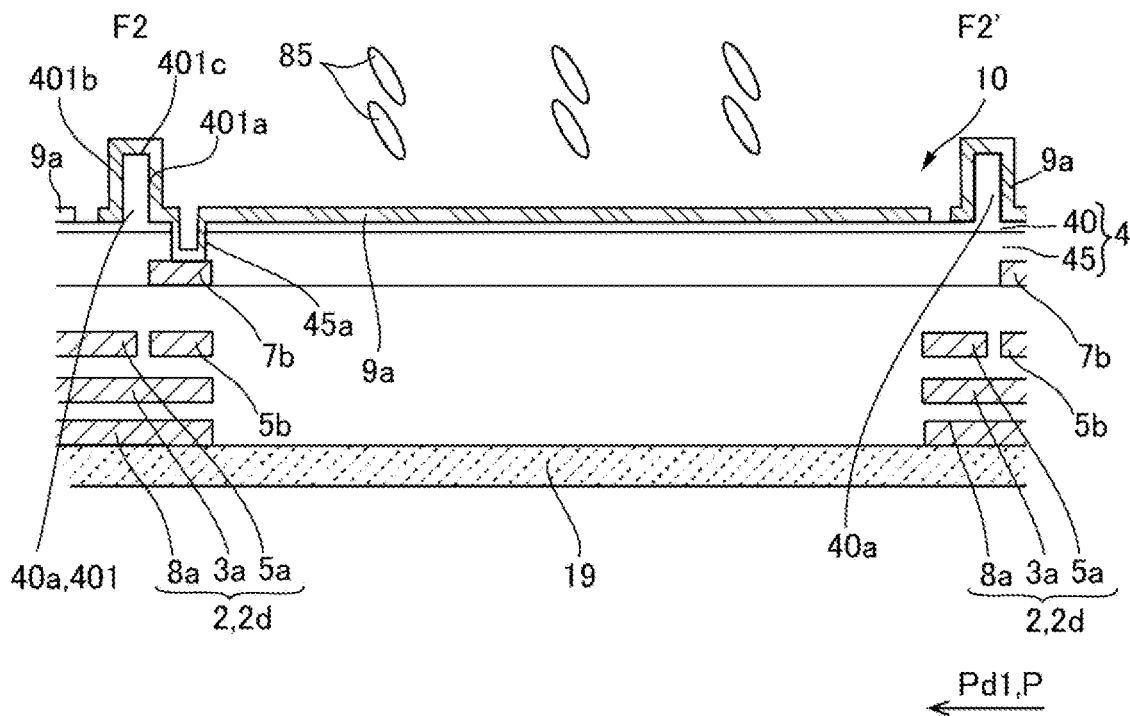
FIG. 13 is an explanatory view schematically illustrating an F2-F2' cross section of FIG. 12.

FIG. 12 is an explanatory view of the liquid crystal device 100 according to Embodiment 2 of the present disclosure, and is an explanatory view schematically illustrating a planar layout of the pixel electrode 9a, the convex portion 40a, and the like that are illustrated in FIG. 5. FIG. 13 is an explanatory view schematically illustrating an F2-F2' cross section of FIG. 12. FIG. 13 is an explanatory view schematically illustrating a G2-G2' cross section of FIG. 12. Note that the basic configuration of the liquid crystal device 100 according to Embodiment 2 is similar to that of the liquid crystal device 100 according to Embodiment 1, and thus, common portions are denoted by identical reference signs and descriptions of these portions will be omitted.

Figure 14:
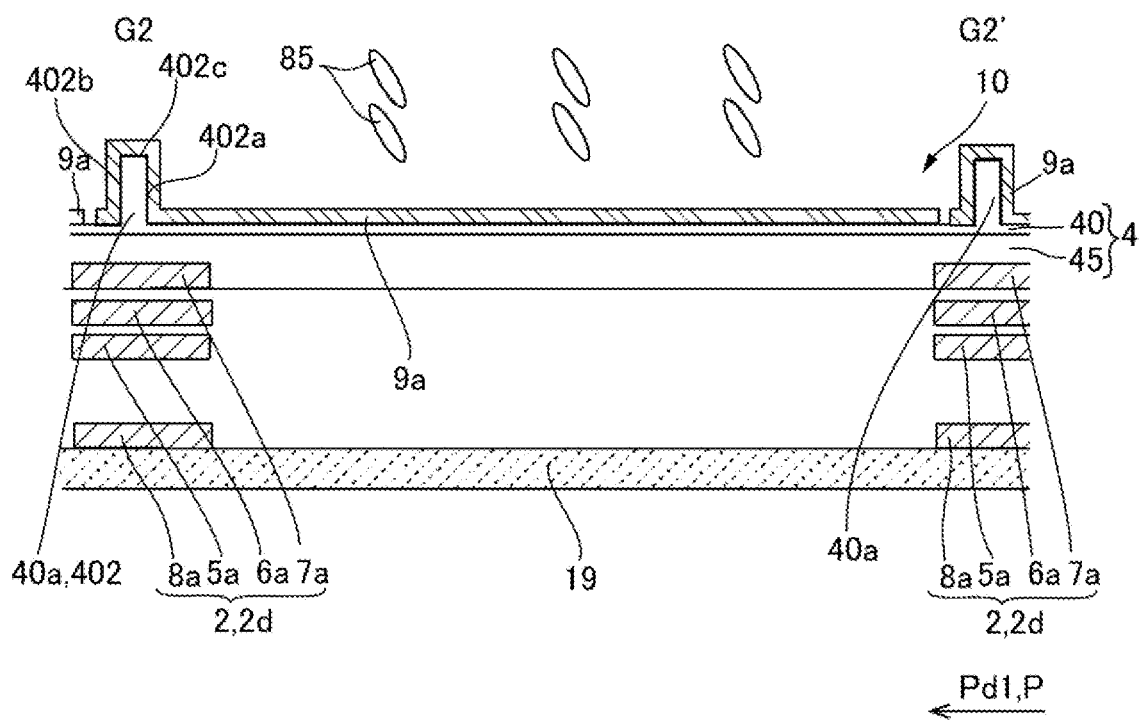
FIG. 14 is an explanatory view schematically illustrating a G2-G2' cross section of FIG. 12.

As illustrated in FIGS. 12, 13, and 14, in Embodiment 2 as well, as in Embodiment 1, between the pixel electrode 9a and the light-shielding member 2, there is provided the insulating member 4 having the convex portion 40a having a lattice shape extending in both the first direction X and the second direction Y along the end portion of the pixel electrode 9a. The pixel electrode 9a also avoids overlapping, in the region along both the first light-shielding member 2a and the second light-shielding member 2b, with the convex portion 40a. In contrast, the pixel electrode 9a is provided in a manner overlapping, in the region along both the third light-shielding member 2c and the fourth light-shielding member 2d, with the convex portion 40a.

Here, in the region along both the third light-shielding member 2c and the fourth light-shielding member 2d, the pixel electrode 9a is provided, at the first portion 401 of the convex portion 40a, along the side face 401a and side face 401b on the both sides in the width direction, and overlaps with the end face 401c. The pixel electrode 9a is also provided, at the second portion 402 of the convex portion 40a, along the side face 402a and side face 402b on the both sides in the width direction, and overlaps with the end face 402c. The rest of the configuration is the same as in Embodiment 1.

When configured in this manner as well, as in Embodiment 1, even when the disturbance has occurred in the alignment of the liquid crystal molecules due to the influence of the lateral electric field, such a disturbance occurs near the boundary region of the pixel. Thus, even when the disturbance has occurred in the alignment of the liquid crystal molecules due to the influence of the lateral electric field, the region where the disturbance has occurred partially or entirely overlap with both the third light-shielding member 2c and the fourth light-shielding member 2d. This makes it possible to appropriately suppress the deterioration in the image quality caused by the disturbance in the alignment of the liquid crystal molecules 85 due to the lateral electric field, to thus achieve advantageous effects as in Embodiment 1, such as displaying an image with high quality.

Embodiment 3

Figure 15:
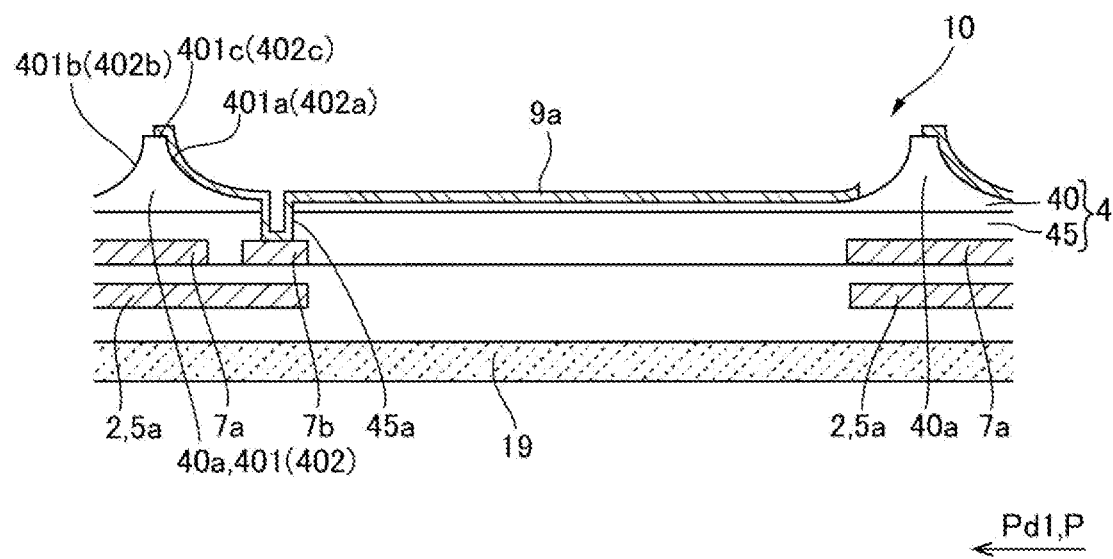
FIG. 15 is an explanatory view of a liquid crystal device according to Embodiment 3 of the present disclosure.

FIG. 15 is an explanatory view of the liquid crystal device 100 according to Embodiment 3 of the present disclosure, and is an explanatory view schematically illustrating a cross-section of the convex portion 40a. Note that in FIG. 15, only the first portion 401 of the convex portion 40a is illustrated, and as for the second portion 402, the reference signs are indicated in parentheses of the corresponding portions. Note that the basic configurations of the liquid crystal device 100 in Embodiment 3 is similar to that of the liquid crystal device 100 of Embodiment 1, and thus, common portions are denoted by identical reference signs and descriptions of these portions will be omitted. In Embodiment 1, the convex portion 40a is formed by etching the insulating member 4 by means of dry etching in step ST3 illustrated in FIG. 11, and the convex portion 40a may also be formed by etching the insulating member 4 by means of wet etching. In this case, the side faces 401a and 401b (the side faces 402a and 402) of the convex portion 40a form curved surfaces. Such a configuration also provides advantageous effects as in Embodiments 1 and 2.

Other Embodiments

In Embodiments 1 to 3, although the present disclosure is applied to the liquid crystal device 100 of VA mode, the present disclosure may also be applied to liquid crystal devices of TN mode, OCB mode, and the like.

Installation Example to Electronic Apparatuses

Figure 16:
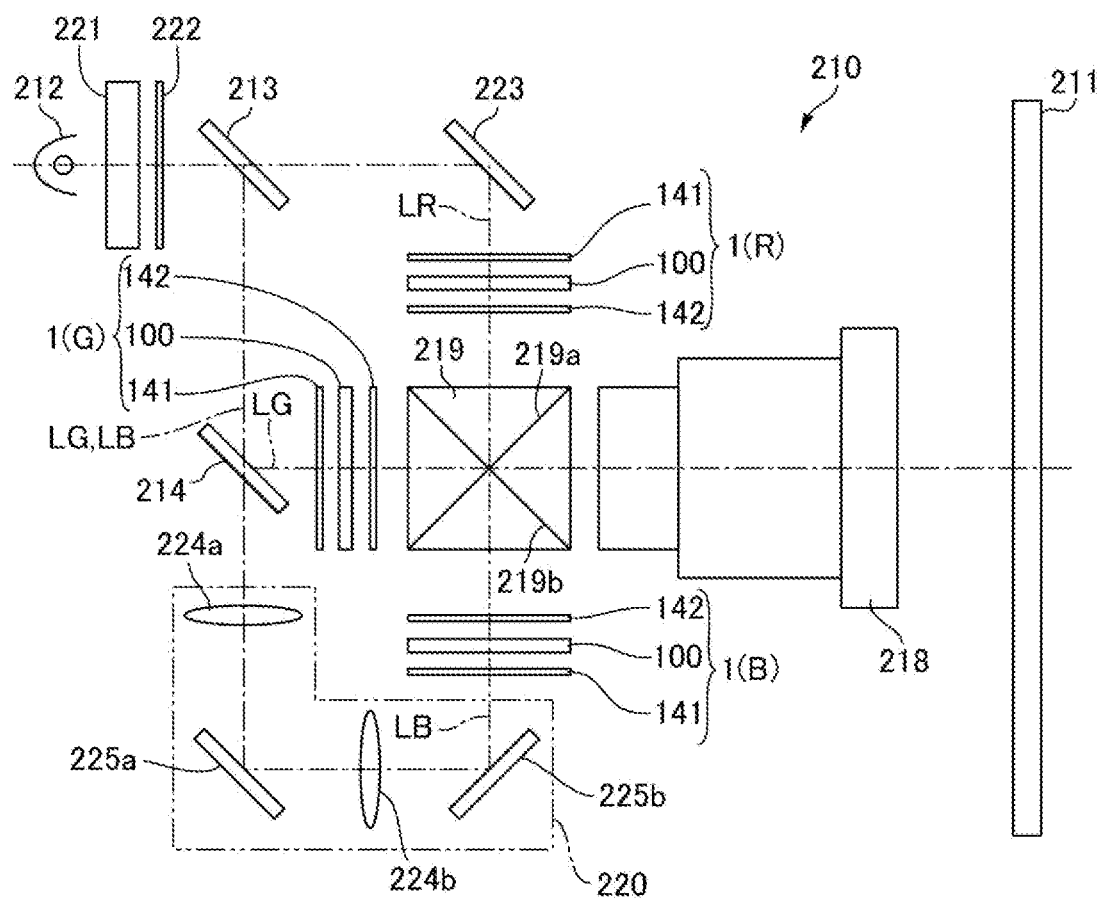
FIG. 16 is a schematic structural diagram of a projection-type display apparatus employing a liquid crystal device to which the present disclosure is applied.

FIG. 16 is a schematic structural diagram of a projection-type display apparatus employing the liquid crystal device 100 to which the present disclosure is applied. Note that in the description below, a plurality of light valves (a light valve for red color 1(R), a light valve for green color 1(G), and a light valve for blue color 1(B)) are used to which light in mutually different wavelength regions is supplied, and the liquid crystal device 100 to which the present disclosure is applied is used in any of the light valves. At this time, a first polarization plate 141 and a second polarization plate 142 are arranged in a crossed Nichol state with respect to the liquid crystal device 100.

A projection-type display apparatus 210 illustrated in FIG. 16 is a forward projection-type projector configured to project an image on a screen 211 provided in front of the projector. The projection-type display apparatus 210 includes a light source unit 212, dichroic mirrors 213 and 214, three light valves (the light valve for red color 1(R), the light valve for green color 1(G), and the light valve for blue color 1(B)), a projection optical system 218, a cross dichroic prism 219 (a color synthesis optical system), and a relay system 230.

The light source unit 212 is configured by an extra-high-pressure mercury lamp for supplying source light containing red light, green light, and blue light, for example. The dichroic mirror 213 is configured to be transmissive of red light LR from the light source unit 212 and reflective of green light LG and blue light LB. The dichroic mirror 214 is also configured to be transmissive of and reflective of green light LG in the green light LG and blue light LB reflected by the dichroic mirror 213. As such, the dichroic mirrors 213 and 214 constitute a color separation optical system configured to separate light emitted from the light source unit 212 into the red light LR, green light LG, and blue light LB. Between the dichroic mirror 213 and the light source unit 212, an integrator 221 and a polarization conversion element 222 are arranged in this order from the light source unit 212. The integrator 221 is configured to equalize the illuminance distribution of the light irradiated from the light source unit 212. The polarization conversion element 222 is configured to convert the light from the light source unit 212 into linear polarized light having a specific vibration direction, such as s-polarized light.

The light valve for red color 1(R) is configured to modulate, in accordance with image signals, the red light LR transmitted through the dichroic mirror 213 and then reflected by a reflection mirror 223, and to emit the modulated red light LR (modulated light) toward the cross dichroic prism 219.

The light valve for green color 1(G) is configured to modulate, in accordance with the image signals, the green light LG reflected by the dichroic mirror 213 and then reflected by the dichroic mirror 214, and to emit the modulated green light LG (modulated light) toward the cross dichroic prism 219.

The light valve for blue color 1(B) is configured to modulate, in accordance with the image signals, the blue light LB transmitted through the dichroic mirror 214, and then passed through the relay system 230, and to emit the modulated blue light LB (modulated light) toward the cross dichroic prism 219.

The relay system 230 includes relay micro lenses 224a and 224b and reflection mirrors 225a and 225b. The relay micro lenses 224a and 224b are provided to prevent a loss of light due to a long optical path of the blue light LB. The relay micro lens 224a is disposed between the dichroic mirror 214 and the reflection mirror 225a.

The relay micro lens 224b is disposed between the reflection mirrors 225a and 225b. The reflection mirror 225a is disposed to reflect, toward the relay micro lens 224b, the blue light LB transmitted through the dichroic mirror 214 and then emitted from the relay micro lens 224a. The reflection mirror 225b is disposed to reflect the blue light LB emitted from the relay micro lens 224b toward the light valve for blue color 1(B).

The cross dichroic prism 219 serves as a color synthesis optical system in which two dichroic films 219a and 219b are orthogonally arranged in an X shape. The dichroic film 219a is configured to reflect the blue light LB and to transmit the green light LG. The dichroic film 219b is configured to reflect the red light LR and to transmit the green light LG.

Thus, the cross dichroic prism 219 is configured to synthesize the red light LR, the green light LG, and the blue light LB modulated by the light valve for red light 1(R), the light valve for green light 1(G), and the light valve for blue light 1(B), respectively, and to emit the synthesized light toward the projection optical system 218. The projection optical system 218, which includes a projection micro lens (not illustrated), is configured to project the light synthesized by the cross dichroic prism 219 onto the screen 211.

Other Electronic Apparatuses

The liquid crystal device 100 to which the present disclosure is applied may be used by a projection-type display apparatus that is configured to use, as a light source unit, an LED light source or a laser light source that emits rays of light in various colors, and the like, and to supply the rays of light in various colors emitted from such a light source to other liquid crystal devices, respectively. The present disclosure may also be utilized as a countermeasure to domains of the liquid crystal device 100 used in a projection-type display apparatus that shifts an axis of image light emitted from the liquid crystal device 100 in a uniaxial direction or a biaxial direction to enhance the resolution.

The liquid crystal device 1 may also be used in a backward projection-type projector for projecting a projection image from a side opposite to a side on which the projection image is to be observed, without being limited to a forward projection-type projector for projecting the projection image from the side on which the projection image is to be observed.

In addition, the electronic apparatus to which the liquid crystal device 1 is applicable is not limited to the projection-type display apparatus 210. For example, the liquid crystal device 1 may be used as a projection-type head-up display (HUD), a direct viewing-type head-mounted display (HMD), and a display unit of an information terminal device such as an electronic book, a personal computer, a digital still camera, a liquid crystal television, a view finder-type or a monitor direct viewing type video recorder, a car navigation system, an electronic organizer, or a POS.

What is claimed is:
1. A liquid crystal device, comprising:
a liquid crystal layer containing liquid crystal molecules;
a first light-shielding member extending along a first direction;
a second light-shielding member extending along a second direction intersecting the first direction;
a third light-shielding member intersecting the second light-shielding member and extending along the first direction;
a fourth light-shielding member intersecting the first light-shielding member and the third light-shielding member, and extending along the second direction;

a transistor provided corresponding to an intersection region between the third light-shielding member and the fourth light-shielding member;

a pixel electrode provided corresponding to the transistor and provided such that end portions of the pixel electrode extend along the first light-shielding member, the second light-shielding member, the third light-shielding member, and the fourth light-shielding member respectively; and an insulating member having a convex portion provided along the end portions of the pixel electrode at a layer between the first light-shielding member, the second light-shielding member, the third light-shielding member, and the fourth light-shielding member, and the pixel electrode, the convex portion disposed inside a region that overlaps with the first light-shielding member, the second light-shielding member, the third light-shielding member and the fourth light-shielding member when viewed in a plan view, wherein:

the liquid crystal molecules have, in a region in which the pixel electrode is provided when viewed in the plan view, an alignment direction set to be a direction intersecting both the first direction and the second direction and facing the intersection region, and wherein the pixel electrode is provided so as not to overlap with the convex portion in a region that overlaps with the first light-shielding member and the second light-shielding member when viewed in the plan view, and is provided so as to overlap with the convex portion in a region that overlaps with the third light-shielding member and the fourth light-shielding member when viewed in the plan view.

2. The liquid crystal device according to claim 1, wherein a width in which the pixel electrode overlaps in the second direction with the third light-shielding member is wider than a width in which the pixel electrode overlaps in the second direction with the first light-shielding member, and a width in which the pixel electrode overlaps in the first direction with the fourth light-shielding member is wider than a width in which the pixel electrode overlaps in the first direction with the second light-shielding member.

3. The liquid crystal device according to claim 2, wherein an insulating member provided on an opposite side of the pixel electrode from the liquid crystal layer is provided with a contact hole, in a region overlapping with the third light-shielding member, for electrically coupling the transistor with the pixel electrode.

4. The liquid crystal device according to claim 2, wherein the insulating member includes a first insulating film and a second insulating film between the first insulating film and the pixel electrode, and wherein the convex portion is provided at the second insulating film.

5. The liquid crystal device according to claim 1, wherein the liquid crystal molecules have negative dielectric constant anisotropy, and the liquid crystal molecules are inclined with respect to a normal direction to the pixel electrode such that first end portions of the liquid crystal molecules on an opposite side to the pixel electrode are located closer to the intersection region than second end portions of the liquid crystal molecules on a side of the pixel electrode are.

6. The liquid crystal device according to claim 1, wherein the pixel electrode is provided, in the region along the third light-shielding member and the fourth light-shielding member, along only one side face of side faces on both sides in a width direction of the convex portion.

7. The liquid crystal device according to claim 1, wherein the pixel electrode is provided, in the region along the third light-shielding member and the fourth light-shielding member, along side faces on both sides of the convex portion so as to cover the convex portion.

8. An electronic apparatus, comprising the liquid crystal device according to claim 1.

9. The liquid crystal device according to claim 1, wherein: the convex portion has a first side face and a second side face on an opposite side of the first side face in a region overlapping with the first light-shielding member, the second light-shielding member, the third light-shielding member, and the fourth light-shielding member, and the pixel electrode is provided, in the region overlapping with the third light-shielding member and the fourth light-shielding member, along only one side face of the first side face and the second side face.

10. The liquid crystal device according to claim 1, wherein the pixel electrode overlaps the convex portion with a first portion overlapping with the third light-shielding member at a part in a width direction of an end face of the first portion on a side of the liquid crystal layer and only one side face of the first portion and not an other side face of the first portion.

* * * * *